INVENTORS.
RICHARD A. STOKES
GEORGE H. BARNES
ALBERT SANKIN
BY Kevin C. McMahon
ATTORNEY

PARALLEL OPERATING ARRAY COMPUTER

Filed Dec. 20, 1967 17 Sheets-Sheet 2

INVENTORS.
RICHARD A. STOKES
GEORGE H. BARNES
ALBERT SANKEN
BY Kevin C. McMahon
ATTORNEY

PARALLEL OPERATING ARRAY COMPUTER

INVENTORS.
RICHARD A. STOKES
GEORGE H. BARNES
ALBERT SANKIN

BY Kevin C. McMahon
ATTORNEY

INVENTORS.
RICHARD A. STOKES
GEORGE H. BARNES
ALBERT SANKIN
BY
Kevin C. McMahon
ATTORNEY

PARALLEL OPERATING ARRAY COMPUTER

INVENTORS.
RICHARD A. STOKES
GEORGE H. BARNES
ALBERT SANKIN
BY
Kevin C. McMahon
ATTORNEY

PARALLEL OPERATING ARRAY COMPUTER

Filed Dec. 20, 1967 17 Sheets-Sheet 6

INVENTORS.
RICHARD A. STOKES
GEORGE H. BARNES
ALBERT SANKIN
BY
Kevin C. McMahon
ATTORNEY INVENTORS.
RICHARD A. STOKES
GEORGE H. BARNES
ALBERT SANKIN
BY Kevin C. McMahon
ATTORNEY INVENTORS.
RICHAR A. STOKES
GEORGE H. BARNES
ALBERT SANKIN
BY Kevin C. McMahon
ATTORNEY INVENTORS.
RICHARD A. STOKES
GEORGE H. BARNES
ALBERT SANKIN
BY
Kevin C. McMahon
ATTORNEY INVENTORS
RICHARD A. STOKES
GEORGE H. BARNES
ALBERT SANKIN
BY Kevin C. McMahon
ATTORNEY

PARALLEL OPERATING ARRAY COMPUTER

Filed Dec. 20, 1967 17 Sheets-Sheet 13

INVENTORS.
RICHARD A. STOKES
GEORGE H. BARNES
ALBERT SANKIN
BY
Kevin C McMahon
ATTORNEY 3,537,074

PARALLEL OPERATING ARRAY COMPUTER

Richard A. Stokes and George H. Barnes, West Chester, and Albert Sankin, King of Prussia, Pa., assignors to Burroughs Corporation, Detroit, Mich., a corporation of Michigan Filed Dec. 20, 1967, Ser. No. 692,186
Int. Cl. G06f *15/16*
U.S. Cl. 340—172.5 22 Claims

ABSTRACT OF THE DISCLOSURE

A data processing system is described which includes a plurality of Control Units each controlling an array of Processing Elements which perform arithmetic and logical operations on data. Associated with each Processing Element is a memory which acts both as a memory for the Processing Element and as a portion of the main memory for the Control Unit. Each Control Unit includes means for executing instructions involving itself simultaneously with the decoding and broadcasting of instructions of the Processing Elements for controlling them. The system communicates with the outside world through a Control Computer which is itself a large scale data processing system. The program for the Control Units and data is transferred from the Control Computer to the Processing Element Memories through an Input/Output Subsystem. The Input/Output Subsystem also transfers data between the Processing Element Memories and a Disc File mass memory.

BACKGROUND OF THE INVENTION

This invention relates generally to large scale data processing systems and more particularly to data processing system including a plurality of arrays of Processing Elements, each array being controlled by a Control Unit.

In the history of the development of digital computers the most important design goal has always been to maximize their operating speed, i.e., the amount of data that can be processed in a unit of time. It has become increasingly apparent in recent times that two important limiting conditions exist within the present framework of computer design. These are the limits of component speed and of serial machine organization.

Since the time fo the early large scale digital computers speed or data throughout has been improved by essentially two methods: first, by increasing the operating speed of the components, and secondly, by selectively adding functional features to the machine to improve the execution times of serial instruction strings. In general, functional features such as index registers, associative memories, instruction look-ahead, high speed arithmetic algorithms, and operand look-ahead have been employed to expedite execution of the instruction strings. It appears that present day computers employing this type of organization, known as "pipe-line" computers, represent a practical limit in the application of these features.

The other limitation, that of components speed, is also approaching its inherent maximum as problems of line capacitance, heat dissipation and signal wire delays become more important. It can now be said that, barring a breakthrough in some undefined area of technology, the rate of increase in the speed of serial organized computers is going to slow down drastically.

For man important classes of problems it has been found that several repetitive loops of the same instruction string are executed with different and independent data blocks for each loop. Attempts have been made in the past to take advantage of this parallelism by recognizing that a computer may be divided into control sections and processing sections and by providing an array of processing elements under the control of a single central control unit. Such a system is disclosed in the following three related patents: 3,287,702, W. C. Borck, Jr., et al.; 3,287,703, D. L. Slotnick; 3,312,943, G. T. McKindles et al. Although the system disclosed in the above-listed patents does use parallel processing to speed data throughput, many problems still exist. The processing elements of this system are rather rudimentary and can handle data only in a bit-by-bit serial manner.

Data to be used by the processing elements in the running of a program was stored in one of two memories which formed part of each processing element. If arithmetic or logic operations were to be performed on two data words, it was necessary to insure that one of the words was in each memory and then fetch the words one bit at a time to the logic circuitry to perform the operation in a bit-by-bit fashion. This method of operation required a great number of memory cycles for each operation and was very time consuming.

The central control unit in this previous system handled program instructions one at a time. Since many instructions in a program are of a "housekeeping" nature and do not involve the processing elements, this resulted in the processing elements being idle for large portions of the time and severely limited system efficiency. Further, since there is only a single control unit, any failure in it shut off the entire system.

Another factor curtailing the efficiency of the system is its inherent inability to adjust the size of the array to the requirements of the problem. If the problem required the use of only a half or a fourth of the processing elements, the rest of them remained idle during the entire time it took to run the problem. Other types of problems may require the full array during one or more portions but require only a portion of the array during the rest of the problem. If the full array is tied up during the entire problem, inefficiency again results.

In the foregoing system the input/output portion thereof made connection with the processing elements along one edge of the array. In order for data located in the center or along the other side of the array to be transferred to the input-output system, it was necessary to transfer the data successively from processing element to processing element across the array to the input-output. This required several shifts, each taking a significant amount of time. Machine flexibility was further limited by the fact that the processing elements along the edges of the arrays could communicate with only two or three other processing elements instead of the four that the interior processing elements could communicate with.

OBJECTIVE AND SUMMARY OF INVENTION

It is therefore an object of this invention to improve array computers.

It is a further object of this invention to provide an array computer in which all of the processing elements can communicate with at least four neighbors.

A further object of this invention is to provide an array computer having a plurality of control units each controlling separate pluralities of processing elements, said control units being operable either separately or in unison.

It is a further object of this invention to provide an array computer where the input/output system can communicate with all of the processing elements.

It is a further object of this invention to provide an array computer in which memory addresses may be indexed both in the control units and in the processing elements.

It is a further object of this invention to improve array computers by allowing the size of the array to be changed during the running of a problem.

It is a still further object of this invention to provide an array computer in which the control units can execute a plurality of instructions simultaneously.

In carrying out these and other objects of this invention there is provided a plurality of arrays of substantially identical processing elements and a control unit for each of the arrays, each control unit controlling the operation of the processing elements of the associated array simultaneously on a microsequence level, the control units including means for performing instruction and not involving the processing elements simultaneously with the decoding and broadcasting of instructions which control the processing element array. The control units also include means for allowing them to operate independently of one another and for dynamically utilizing them to form two double size arrays or a single quadruple size array. Associated with each processing element is a memory used for storing both data and for use in the processing element and a portion of the control unit program. Each processing element includes a plurality of mode bits which permit individual control of the processing elements and indicate conditions in individual processing elements to the control unit. The processing elements and the control units also both include means for incrementing processing element memory addresses for allowing greater flexibility in the machine. Each processing element communicates with at least four other processing elements in its own or other arrays. Also provided is a mass memory and a high data rate input/output subsystem for communicating between all the processing units memories in the arrays and the mass memory. A control computer governs the data flow between the mass memory and the processing units memories and programs and controls the operation of the control units.

Various other objects and advantages and features of this invention will become more fully apparent in the following specification with its appended claims and accompanying drawings in which:

DETAILED DESCRIPTION

System description

Figure 1:
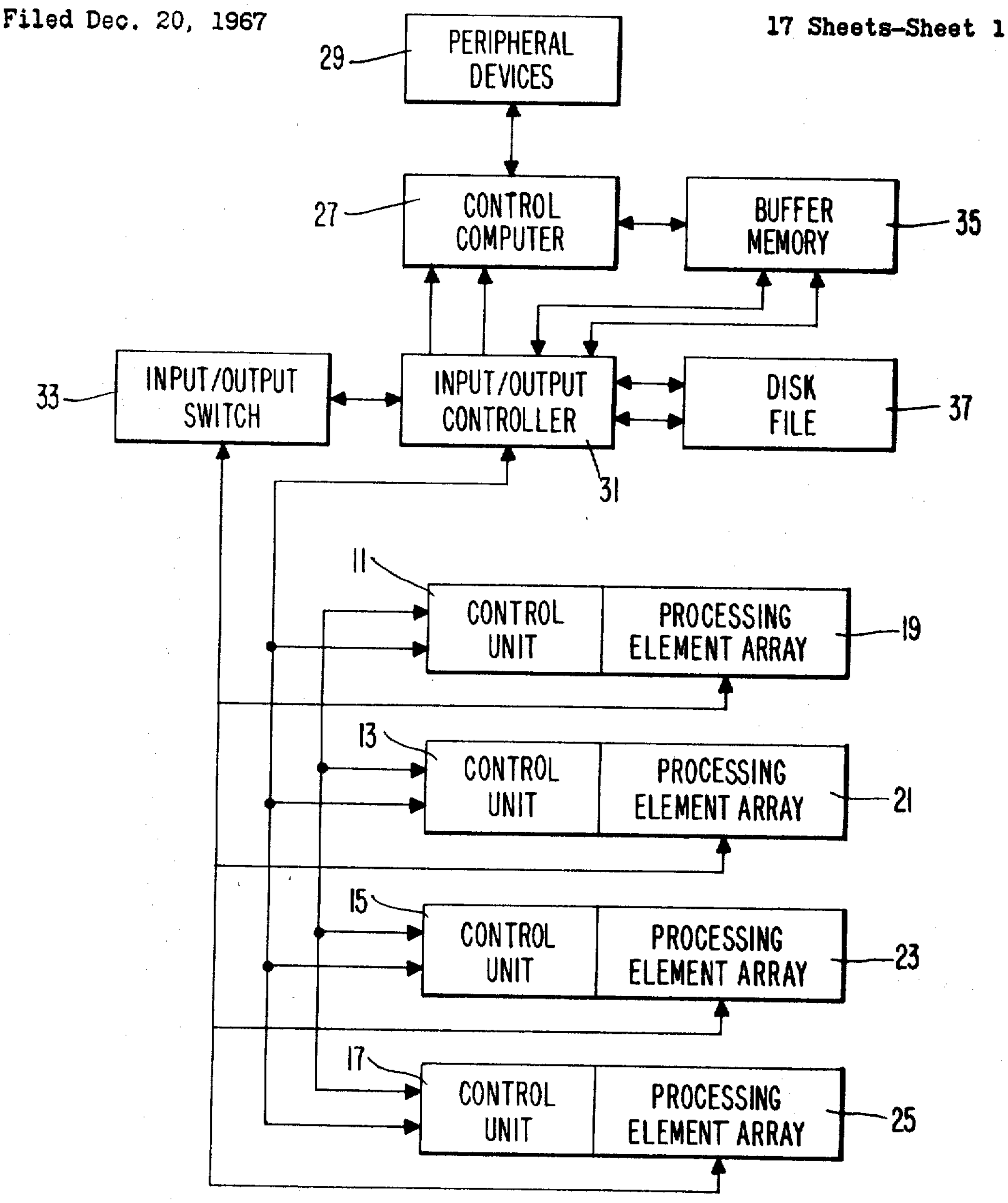
FIG. 1 is a block diagram of a system embodying the invention.

Referring to FIG. 1 of the drawings, there is shown a block diagram of the entire system. As illustrated, four Control Units (CU) 11, 13, 15 and 17 are directly coupled to and control on a microsequence level the Processing Element (PE) arrays 19, 21, 23 and 25, respectively. In the embodiment of the invention to be described herein, over 200 control lines connect the CU's to each PE. Associated with each PE of the arrays is a PE Memory (PEM) (not shown in this figure), which is used to store both data for the associated PE and a portion of the program for the CU. The CU's interpret their instructions and break them down into microsequences of timed voltage levels which are broadcast via the control lines to all PE's simultaneously for selectively controlling and enabling the operations of each of the PE circuits.

Constants and other operands which are used in common by all the PE's are broadcast by the CU's to the PE's in conjunction with the instruction using them.

The operation of the entire system is controlled by a Control Computer 27 which is a large scale data digital processing system in itself, and which may consist of a commercially available computer. The system communicates with the outside world through the peripheral devices 29 of the Control Computer 27. The Control Computer 27 communicates with the arrays through the Input/Output (I/O) subsystem which consists of the Input/Output Controller (IOC) 31, the Input/Output Switch (IOS) 33, the Buffer Memory (BIOM) 35 and the Dual Disc File 37.

The Control Computer 27 takes the program inserted through its peripheral devices 29 and by means of a supervisory program which is permanently resident in its memory, translates the inserted program into the proper language for the CU's of the array. The Control Computer 27 then sends the CU program to the PEM's by first transferring it to the Disc File 37 through the BIOM 35 and the IOC 31 and then transferring it from the Disc File 37 to the PEM's through the IOC 31 and IOS 33.

The IOC 31 transfers data and CP programs between the Disc File 37 and the PEM's under the supervision of the Control Computer 27. The Control Computer 27 may also transfer interrupt and diagnostic programs through the IOC 31 to the CU's without going through the Disc File 37.

The PE's can act either as four separate arrays, as two double size arrays, or as a single quadruple size array, depending on the commands from the Control Computer 27. If the system is operating in a multiquadrant array mode, instructions or operands stored in the PEM's or CU of one array are broadcast by the CU to the other CU's in the multiquadrant array whenever necessary.

In the embodiment of the invention being described, although this is not intended as a limiting aspect of the inventive concept, each PE array contains 64 PE's each having a PEM associated therewith. Each PEM can transfer data to or receive data from the Disc File 37. Therefore, for a theoretically perfect match between the I/O subsystem and the PE arrays, the data rate of the I/O subsystem and the Disc File 37 should be 256 times as fast as the 250 nanosecond memory cycle time of the PEM's. Although this is presently not practicable, it is important for efficient machine operation that the I/O subsystem have an extremely high data rate.

The illustrated embodiment of this invention may use a 64 bit data word in the PE's and may operate either in a fixed or floating point mode (as these terms are generally interpreted and used). In the 64 bit floating point mode the most significant bit is the sign bit, the exponent occupies the next 15 bits and the mantissa field occupies the last 48 bits.

Many computations do not require the full 64 bit precision of the PE's. To make more efficient use of the hardware and so as to increase the speed of computations, each PE may be partitioned into either two 32 bit floating point or eight 8 bit fixed point subprocessors.

In the 32 bit floating point mode the 64 bits are divided into 32 bit inner and outer words with the most significant bit (bit "0") being the outer sign bit, bits "1" through "7" the outer exponent field, bit 8 the inner sign, bits "9" through "15" the inner expondent, bits "16" through "39" the inner mantissa, and bits "40" through "63" the outer mantissa.

The subprocessors are not completely independent in that they share common registers and the 64 bit data routing paths and some arithmetic operations are not performed simultaneously on both the inner and outer bits in the 32 bit mode.

Figure 2:
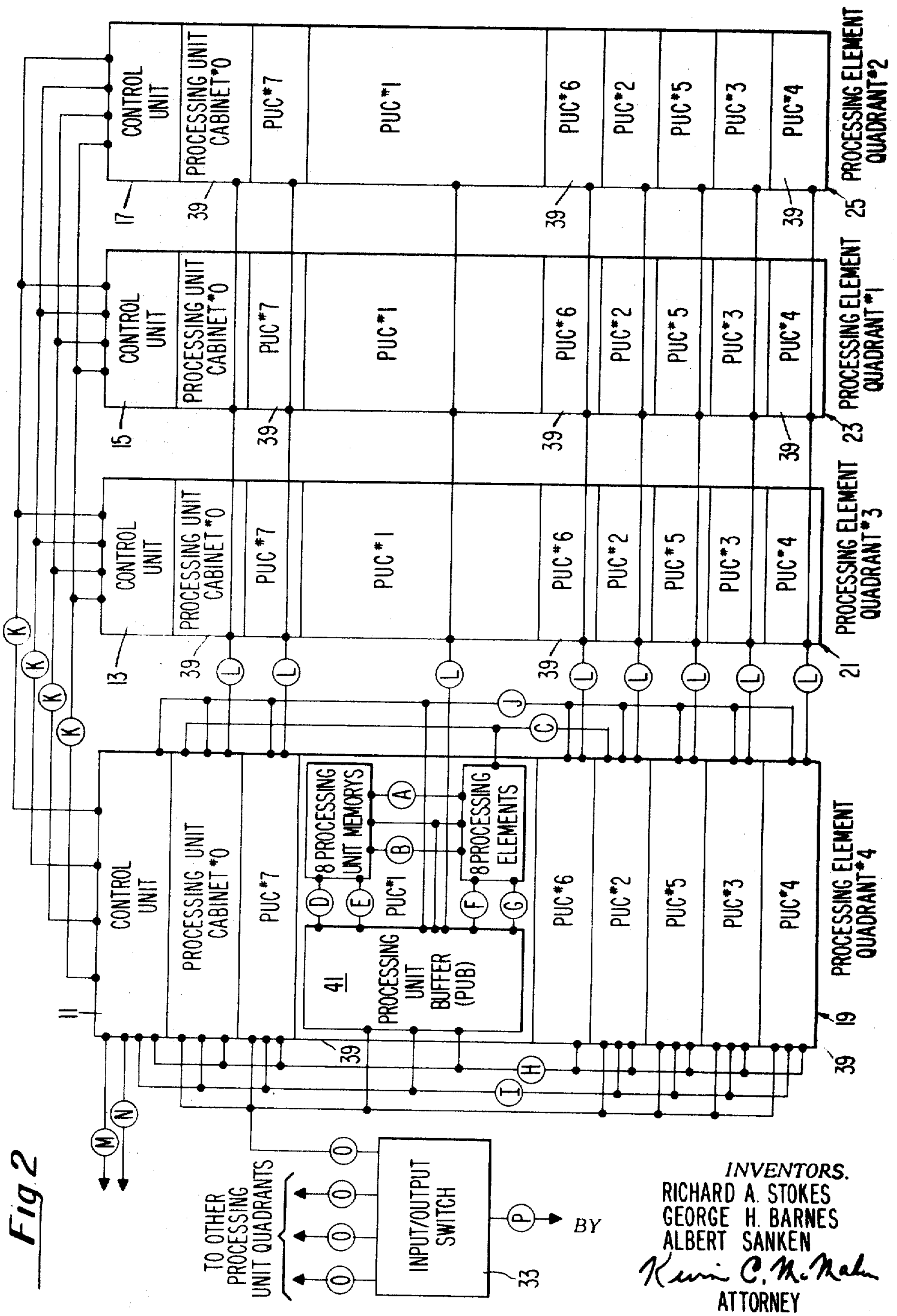
FIG. 2 is a block diagram of the array of processing elements shown the data paths necessary for proper machine operation.

FIG. 2 is a block diagram of the CU and PE array portion of the system showing the data transfer paths which are necessary for proper system operation. CU's 11, 13, 15 and 17 control the PE arrays in Quadrants 0, 3, 1 and 2, respectively. The PE's within each array are arranged in identical stacks of eight Processing Unit Cabinets (PUC's) 39, each PUC 39 containing 8 PE's and 8 PEM's. Each PUC 39 also contains a Processing Unit Buffer (PUB) 41 which forms the interface between the PE's and the PEM's in the PUC 39 and the CU, the I/O subsystem and the other quadrants.

The necessary data transfer paths are designated A through P in FIG. 2 and their significance is set out in the following table:

| Letter | Data Path |
|---|---|
| A | A full word (64 bits) bidirectional path between each PE and its own PEM for data fetching and storing. |
| B | A partial word (16 bits) unidirectional path between each PE and its own PEM for all array memory addressing. |
| C | A full word (64 bits) bidirectional path between each PE and each of its four designated neighbors for internetwork data transfers. |
| D | A 8-word (256 bits) unidirectional path between each PEM and the Processing Unit Buffer (PUB) of the Processing Unit Cabinet (PUC) for transfers to IOS and the CU. |
| E | A 2-word (128 bits) unidirectional path between the PUB and the PEM's for I/O stores. |
| F | A 2-word (128) bits) bidirectional path between two PE's and the PUC for interquadrant routing. |
| G | A 1-word (64 bits) unidirectional path between the PUB and all eight PE's in the PUC. |
| H | A full word (64 bits) unidirectional path from the CU to each of its eight PUC's for operand broadcasting, memory addressing and shift count transfers. |
| I | A 200 bit (approximately) unidirectional path for CU sequencing of the PE quadrant. |
| J | A 8-word (512 bits) unidirectional path (one word from each PUB) for data transfers to the CU. |
| K | A full word (72 bits) bidirectional path between each of the four CU's in the system for synchronizing and for the distribution of common operands in the united array mode. |
| L | Four full word (64 bits) bidirectional PUC's paths between adjacent PE's in all four quadrants for interquadrant routing. |
| M | A full word (64 bits) bidirectional path between the four CU's and the I/O subsystem. |
| N | A partial word (32 bits) unidirectional path between the four CU's and the I/O Controller for Memory Addressing. |
| O | A 16-word (1,024 bits) bidirectional path between the IOS and each PE quadrant. |
| P | A 16-word (1,024 bits) bidirectional path between the IOS and the IOC. |

The data transfer paths among the PE's are best shown in FIGS. 3A through 3D of the drawing. In these figures the 64 PE's of one quadrant are shown as they are actually physically arranged in this embodiment of the invention. They are shown numbered octally from 00 through 77 with the units digit representing the PUC in which the particular PE resides and the eights digit representing the number of the PE within the PUC.

Both the PE's within the cabinet and the cabinet in the array are shown numbered in a "folded" fashion, that is, the numbers 5 through 7 are interleaved between numbers 2 and 3, 1 and 2, 0 and 1 respectively.

Each PE has a single 64 bit wide output path which goes to the inputs of the ±8 and the ±1 octally numbered PE's, for enabling the routing of data to them. The PE's numbered 00 and 70 through 77 may route either end around, if the quadrants are operating independently, or may route interquadrant if two or more of the quadrants are working together in a single array.

Figures 3, 3A:
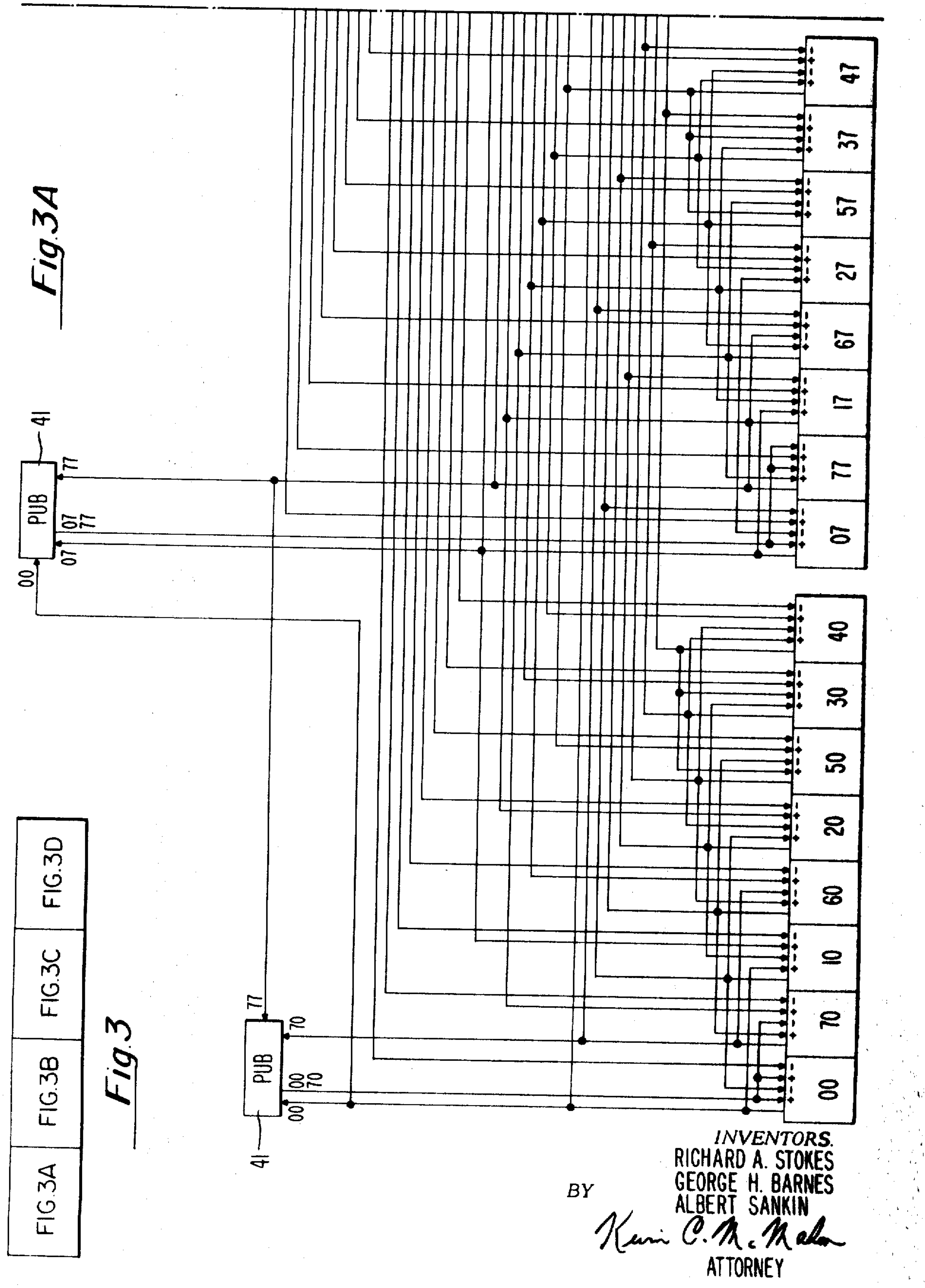
FIG. 3 is a diagram illustrating the interrelation among FIGS. 3A–3D.
FIGS. 3A–3D is a block diagram of one quadrant of processing elements showing the necessary interconnections for routing data among them.
Figure 3B:
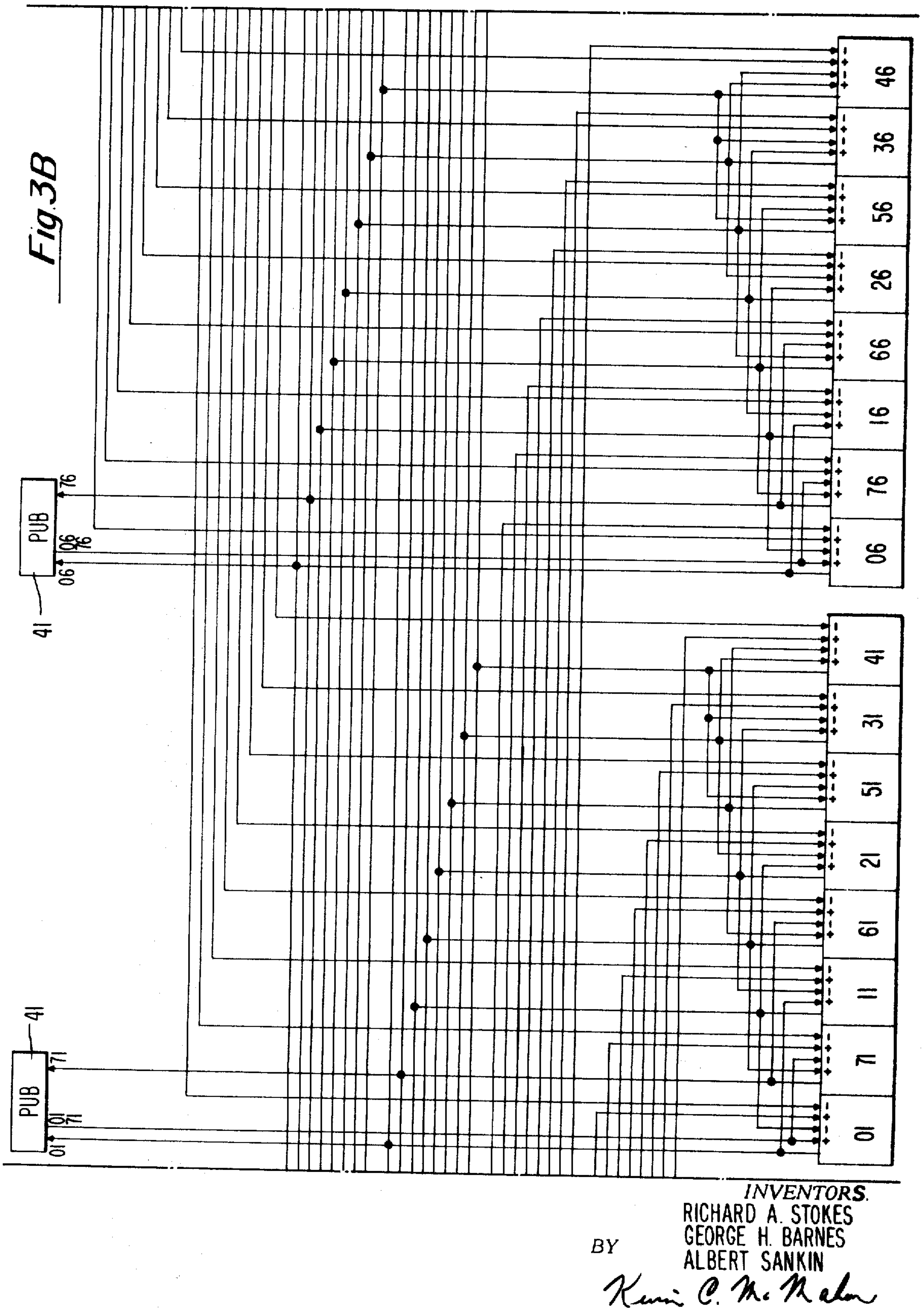
Figure 3C:
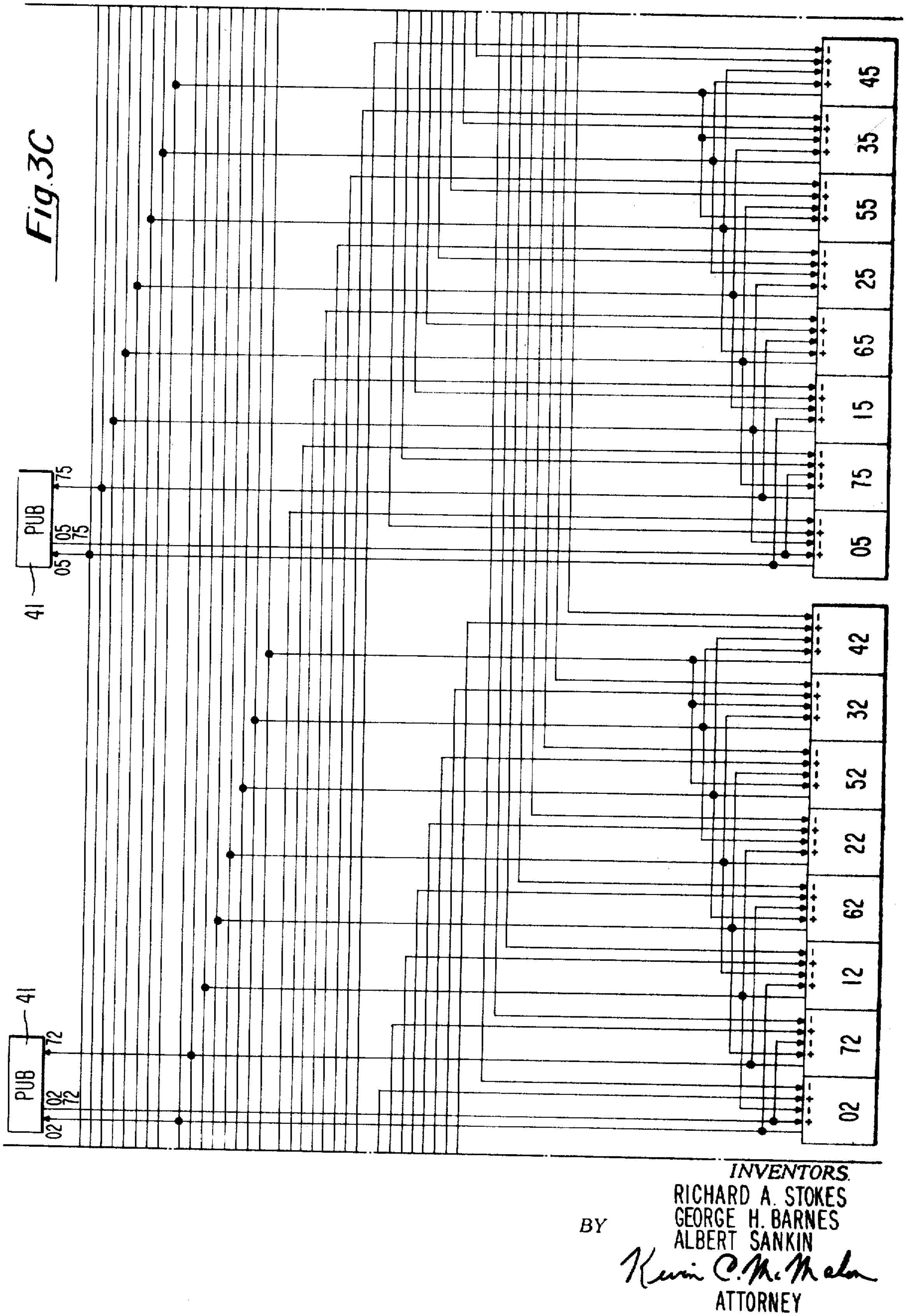
Figure 3D:
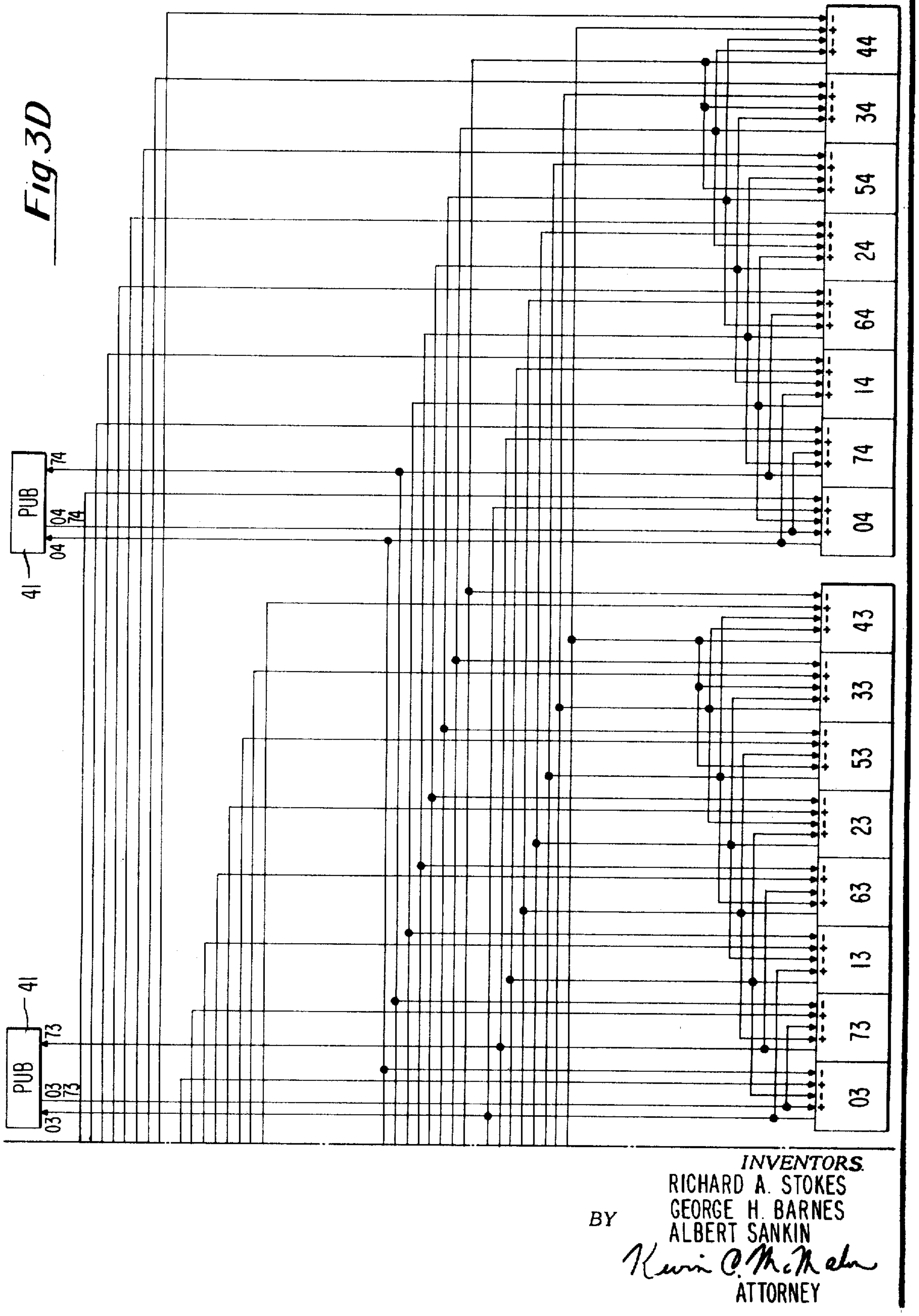

The plus or minus sign at each of the PE input lines in FIG. 3 indicate that an input is the product of +8. −8. +1 or −1 route, respectively.

By numbering and connecting the PE's and PUC's as shown, two beneficial effects are achieved. First, all of the ±8 routes are intracabinet except when the system is operating in a multiquadrant mode and the ±1 shifts are at most 2 cabinets long. Second, the interquadrant routes are distributed throughout the eight PUC's 39 instead of all being taken from the first and last cabinet. In this way each of the cabinets are more nearly identical thereby allowing for ease of physical design.

Intra and interquadrant data transfer times are functions of the longest single cable run involved. It can be shown that in the above-described interconnection scheme the longest cable length is minimized and thus the highest data transfer speed is achieved.

All routes which are always intraquadrant are directly wired from the output of one PE to the input of the other PE. Those routes which may be either inter or intraquadrant go through the PUB 41 where enabling signals from the CU determine the path taken by the data. The outputs shown from the PUB's 41 each go to two PE's within its associated PUC 39. The determination of which of the PE's actually receives the data is determined by enabling signals to the PE's from the CU.

Besides the connections shown in FIGS. 3A through 3D, the PUB's 41 also have an output going to the PUB 41 of the corresponding PUC 39 in each of the other three quadrants and three separate inputs coming from the PUB's 41 of the corresponding PUC's 39 of the other three quadrants. These connections are used for interquadrant routing and are shown as path L in FIG. 2. If two or more quadrants are operating as a single array, all +8 routes from PE's numbered "7X," all −8 routes from PE's numbered "0X," the +1 route for PE "77," and the −1 route for PE "00" are interquadrant. The quadrant to which the information is routed is determined by the CU's.

Taking PE 76 as an example, its +1 route goes to the +1 input of PE 77, its −1 route to the −1 input of PE 75, and its −8 route to the −8 input of PE 66. For that +8 route it is necessary to go through the associated PUB 41. This route is either to the +8 of PE 06 if the route is end around, or to the +8 input of PE 06 of another quadrant if the route is interquadrant.

The illustrated interconnection scheme may be generalized to any number of PE's or quadrants. It may be thought of as arranging the PE's in a rectangular array and folding the array both ways to bring each edge next to the opposite edge. For instance, if there were 100 PE's numbered decimally and arranged in 10 cabinets, numbers 9 through 6 would be interleaved among numbers 0 through 5 and the inter PE connections would be ±10 and ±1. Again, the longest lead length would be minimized.

The processing element

Figure 4:
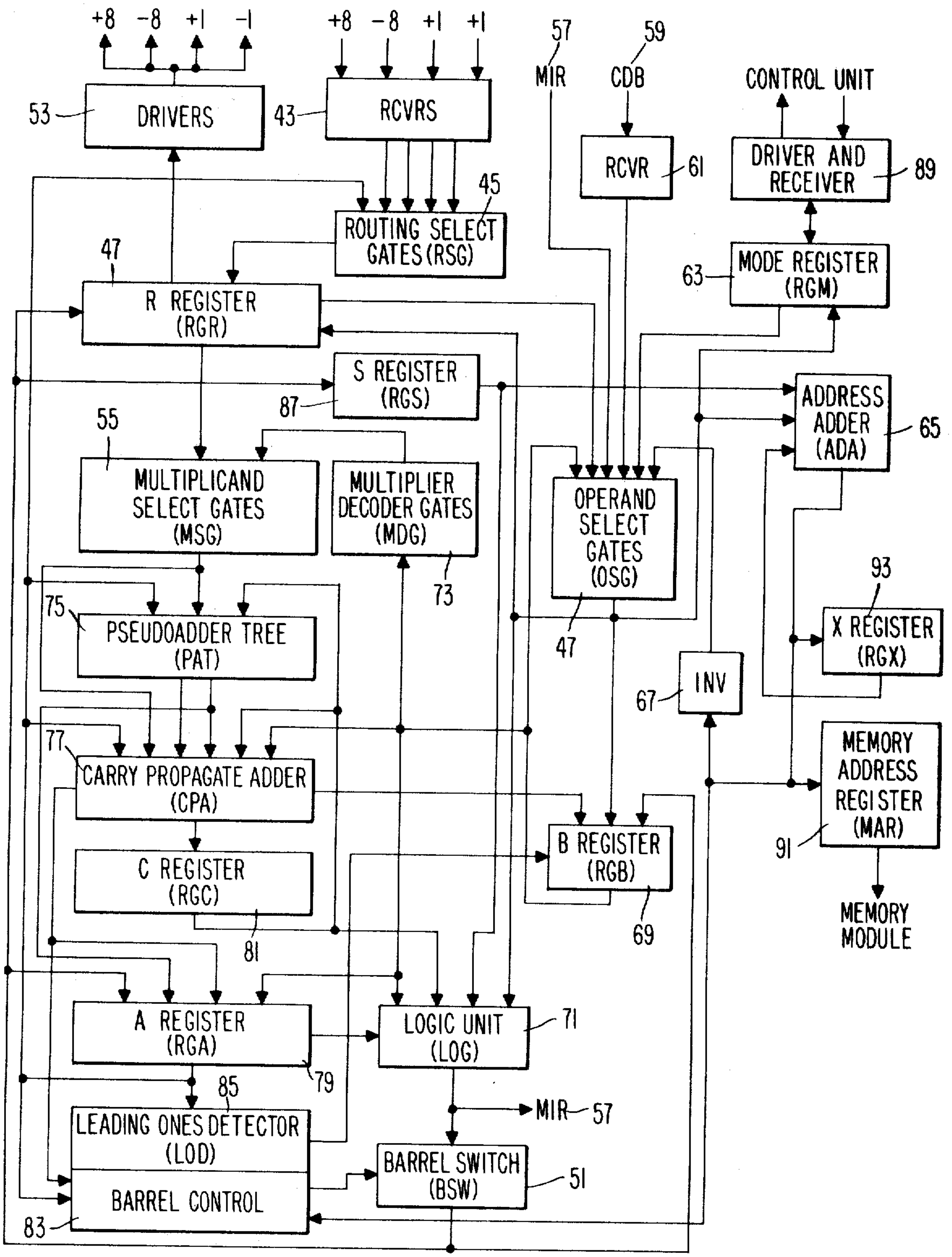
FIG. 4 is a block diagram of a processing element.

Each Processing Element (PE) is essentially a general purpose computer having the control logic removed. They contain arithmetic and logic circuitry for performing operations on data at the direction of the Control Unit (CU) and each has associated with it a Processing Element Memory (PEM) which acts both as a memory for the PE and as a portion of the memory of the CU. A block diagram of a PE is shown in FIG. 4 of the drawings.

The PE receives data from its +8, −8, +1 and −1 neighbors through 4 sets of 64 bit wide receivers 43 which are connected through the Routing Select Gates (RSG) 45 to the input of the R Register (RGR) 47. The RGR 47 is a 64 bit gated register which can also receive 64 bit parallel inputs from the Operand Select Gates (OSG) 49 or the Barrel Switch (BSW) 51. RGR 47 has outputs going to the Drivers 53 for routing data to other PE's, to the OSG 49 and to the Multiplicant Select Gates (MSG) 55.

The OSG 47 which may be identical to the RSG 45 is a 64 bit wide set of gates which gate one of six inputs to its output. The inputs come from the RGR 47, from the Memory Information Register (MIR) 57 of the associated PEM, from the Common Data Bus (CDB) 59 through a Receiver 61, from the Mode Register (RGM) 63, from the Address Adder (ADA) 65 through an inverter (INV) 67 and from the B Register (RGB) 69. Its output goes to the RGB 69, to RGR 47, to the Logic Unit (LOG) 61 to ADA 65 and to RGM 63.

The CDB 59 is a path from the CU over which it broadcasts data ot all of the PE's in parallel. The MSG 55 also receives a control input from the Multiplier Decoder Gates (MDG) 73. Its output goes to the Pseudo Adder Tree (PAT) 75 and the Carry Propagate Adder (CPA) 77. The MSG 55 is used in multiplication and division operations. The PAT 75 is formed of a series of cascaded 56 bit wide carry save adders and is also used in multiplication and division operations. Besides receiving input signals from the MSG 55, the PAT 75 also receives inputs from the A Register (RGA) 79 and from C Register (RGC) 81. The sum and carry outputs of the PAT 75 go to the Carry Propagate Adder (CPA) 77 which may act either as a carry save adder and thus be part of the PAT 75, or as a carry propagate adder whose output is the true sum of the inputs.

The CPA 77 is used in all arithmetic and most logic operations and receives inputs from the PAT 75, RGB 81, RGB 69, MSG 55 and RGA 79. The CPA 77 has outputs going to RGC 81, RGB 69, RGA 79 and to the Barrel Control 83. RGC 81 is an ungated register used to hold the carry output of the CPA 77 when it is acting as a carry save adder.

RGA 79 is a 64 bit gated register and may be structurally identical to RGR 47 and to RGB 69. RGA 79 has outputs going to LOG 71, to the Leading Ones Detector (LOD) 85, to CPA 77, to the PAT 75 and to RSG 45. RGA 79 acts as an accumulator during arithmetic and logical operations with a combination of RGA 79, RGB 69 and RGR 47 holding the operands to be operated upon.

The LOD 85 is used for normalizing the numbers in RGA 79 by shifting them in the BSW 51. The LOD 85 is colsely connected with the Barrel Control 83 for controlling the operation of the BSW 51. The output of the LOD 85 also goes to the RGB 69 and the output of the Barrel Control. 83 goes to BSW 51. Data to be shifted in the BSW 51 is inserted into it through the LOG 71. The LOG 71, which may be physically identical to RSG 45 and the OSG 49, has inputs from RGA 79, from RGB 69, from RGC 81, from RGS 87 and from OSG 49. The output of LOG 71 goes to the BSW 51 and to the Memory Information Register (MIR) 57 of the associated PEM.

The BSW 51 is used for shifting operands any desired or required number of places either to the left or right, end around or end off. It has inputs from the LOG 71 and the Barrel Control 83 and its output goes to RGB 69, RGA 79, RGS 87 and RGR 47. The operation of the BSW 51 is controlled by the Barrel Control 83.

RGB 69 has inputs from the OSG 49, the CPA 77 and the BSW 51 and is used to hold operands during arithmetic operations. It may be identical in structure to RGR 47 and RGA 79 and its output goes to the OSG 49, the CPA 77, the MDG 73, RGA 79 and LOG 71.

The Mode Register (RGM) 63 is eight bits wide in this embodiment of the invention and contains various enable, fault and test bits whose function will be described more fully in reference to FIG. 5. RGM 63 communicates with the CU on a one bit wide path through a Driver and Receiver 89. RGM 63 also may be loaded or read in parallel by the OSG 49.

The Memory Address Register (MAR) 91 holds the address of the location in the PEM which is being addressed by the PE, the CU or the I/O. In this particular embodiment of the invention the memory address is 11 bits long. The MAR 91 is 16 bits long to accommodate overflow in the memory addresses and for reasons to be explained subsequently in connection with FIG. 5. Addresses are inserted into the MAR 91 from the ADA 65 which has inputs from the OSG 49, from RGS 87, and from the X register (RGX) 93. The memory address is inserted into the ADA 65 by the CU through the OSG 49. The address can then be inserted directly into the MAR 91 or it can be incremented by the contents of RGX 93 or RGS 87 before being inserted into MAR 91.

Figure 5A:
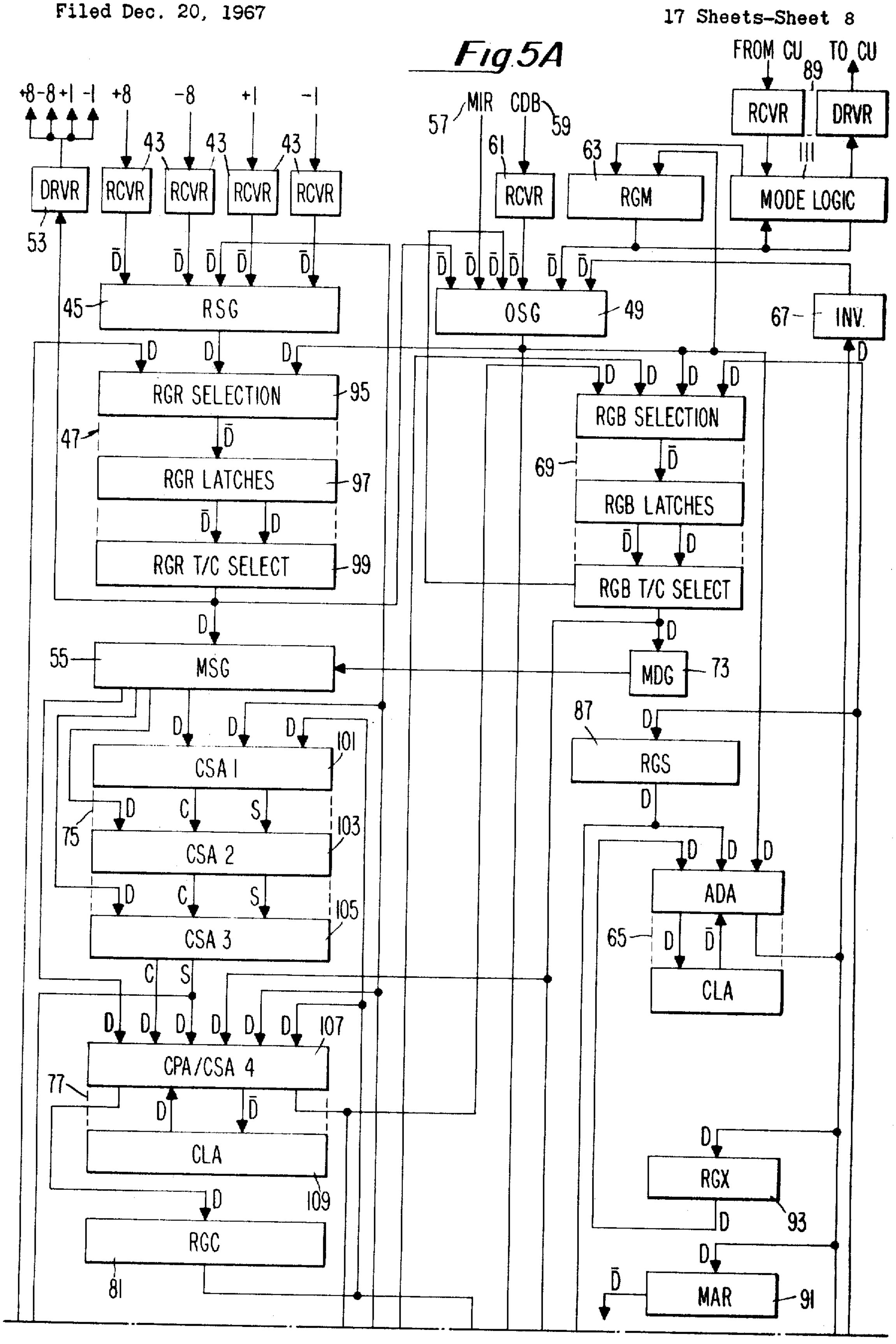
FIGS. 5A and 5B is a more detailed block diagram of a processing element.
Figure 5B:
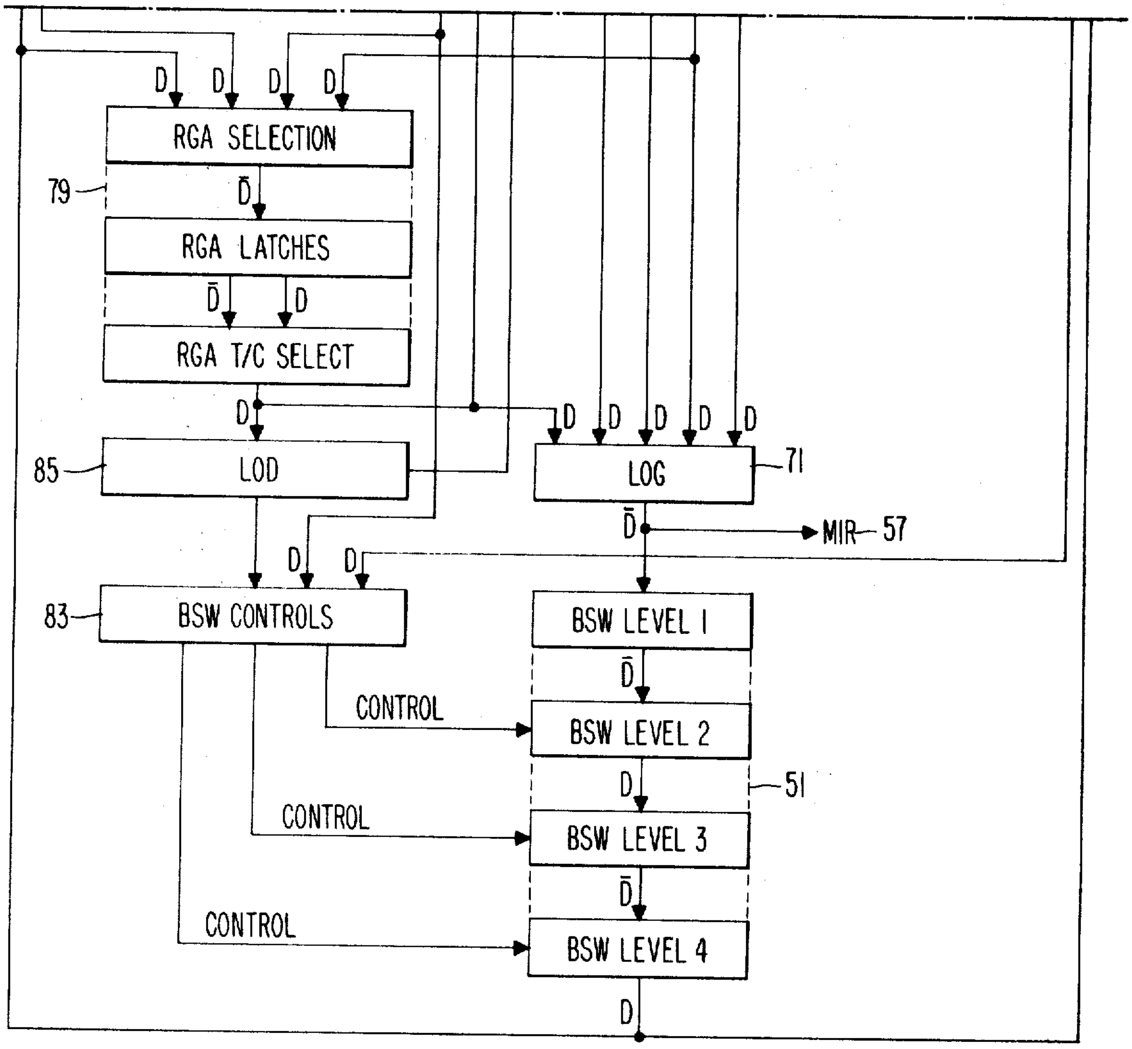
Figure 5:
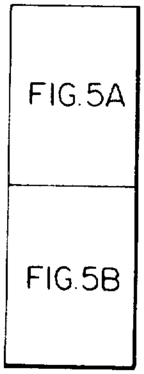
FIG. 5 is a diagram illustrating the interrelation between FIGS. 5A and 5B.

A more detailed drawing of the arithmetic portion of the PE is shown in FIGS. 5A and 5B of the drawings. Corresponding portions of FIGS. 4 and 5 are numbered similarly.

Information may be received from the +8, −8, +1 or −1 neighbors of the PE through 4 sets of 64 bit wide receivers 43. The outputs of the receivers are connected to the RSG 45 which gates one set of its inputs through to RGR 47 in response to enabling signals from the CU.

In the illustrated embodiment of the invention, RGR 47 is a 64 bit wide gated register which is made up of three sections. The Selection Section 95 receives a plurality of inputs and gates, one of them through to the Latch Section 97, in response to enable signals from the CU. The Latch Section 97 includes 64 bi-stable elements which store the 64 bit data word. The contents of the register are read out by the True or Complement Select portion (T/C Select) 99 which reads out either the true or complement of the data stored in the latches in response to enabling signals from the CU.

RGR 47 is used by the PE to provide communication with the outside world and for intermediate storage when the PE is executing instructions. The contents of RGR 47 may be read out of or written into even though the PE is in a disabled mode. The contents of RGR 47 may be transferred to the ±8 or the ±1 neighbors of the PE through the 64 bit wide Drivers 53 in response to signals from the CU.

RGA 79 and RGB 69 may be physically identical to RGR 47 and are used during arithmetic and logical operations for intermediate storage when the PE is executing instructions. RGA 79 also acts as the accumulator for the PE.

The BSW 51 includes four levels of shifting gates. The first level shifts the input either 0 or 32 places to the right. The second level shifts the output of the first level either 0, 16, 32 or 48 places to the right. The third level shifts the output of the second level either 0, 4, 8, or 12 places to the right, and the fourth level shifts the output of the third level either 0, 1, 2 or 3 places to the right.

It is possible to perform multiplication in the PE with the illustrated embodiment of the invention in either the 32 or the 64 bit mode. In both the 32 and 64 bit mode the multiplicant is originally placed in RGA 79 and the multiplier in RGB 69. The product of the multiplication has a double length mantissa which in the 32 bit mode is placed in the inner mantissa portions of RGA 79 and RGB 69 for the inner operand and in the outer mantissa portions of RGA 79 and RGB 69 for the outer operand. In the 64 bit mode the product mantissa is placed in the mantissa portion of RGA 79 and RGB 69.

The structure of the MSG 55, the PAT 75 and CPA 77 will now be discussed in relation to 64 bit mode multiplication. 64 bit mode multiplication requires nine clock times after the multiplier and multiplicand are placed in RGB 69 and RGA 79 respectively. During the first clock time the mantissa of RGA 79 is transferred to RGR 47 through RSG 45, the sign of the product is determined in special logic (not shown) and placed in sign bit of RGA 79 and the exponents of RGA 79 and RGB 69 are added in the CPA 77 and inserted into the exponent portion RGA 79. Also during this first clock time, the least significant bit of the multiplier in RGB 69 is sensed and if it is "zero" the mantissa portion of RGA 79 is cleared, if it is "one," RGA 79 is left unchanged. The next eight more significant bits of the multiplier are transferred from RGB 69 to MDG 73 and RGB 69 is shifted right eight positions.

The MSG 55 is a fifty-six bit wide set of gating logic which receives the 48 bit wide mantissa of the multiplicand from RGR 47 and gates out either the mantissa, "zero," two times the mantissa, that is, the mantissa shifted one place to the left, or the two's complement of the mantissa on one of its four output lines in response to enable signals from the MDG 73.

The Pseudo Adder Tree (PAT) 75 is made up of three 56 bit wide Carry Save Adders (CSA1, CSA2 and CSA3) 101, 103 and 105, see FIGS. 5A and 5B. Each CSA adds three inputs and gives as an output a sum output and a carry output. Thus, for example, if the four bit binary numbers 1011, 1010, and 0111 were being added in the Carry Save Adder, the sum output would be 0110 and the carry output would be 1011. The sum and carry outputs of the CSA3 105 go to the CPA 77 which acts as CSA4 during most of the multiplication operation.

The output paths of the MSG 55 which may be referred to as Word 1, Word 2, Word 3 and Word 4, go to CSA1 101, CSA2, 103, CSA3 105 and CSA4 107, respectively. Word 1 is wired into CSA1 101 from the MSG 55 shifted seven places to the right so that the mantissa of RGR 47 is transferred by the Word 1 x 1 path into CSA1 101 seven places to the right from where it appeared in RGR 47. Word 2 is wired in the CSA2 103 five places to the right and Word 3 is wired into CSA3 105 three places to the right. Word 4 is wired into the CSA4 107 shifted one place to the right. This displacement of the mantissa of RGR 47 by Words 1, 2, 3 and 4 is necessary so that the partial products formed in the multiplication operation are given the correct weights relative to one another.

In the second clock cycle the MDG 73 successively examines bit pairs of its 8 bit segment of the multiplier starting with the least significant bits and transmits enable signals for each bit pair to the MSG 55 in accordance with the following table:

| Bit Pair | Carry In | Multiple | Carry Out |
|---|---|---|---|
| 00 | 0 | 0 | 0 |
| 01 | 0 | 1 | 0 |
| 10 | 0 | 2 | 0 |
| 11 | 0 | −1 | 1 |
| 00 | 1 | 1 | 0 |
| 01 | 1 | 2 | 0 |
| 10 | 1 | −1 | 1 |
| 11 | 1 | 0 | 1 |

For each bit pair the right hand bit has a weight of $2^0$ or 1 and the left hand bit has a weight $2^1$ or 2. If the bit pair is 00, 01 or 10, no problem exists since this involves only the MSG 55 gating either 0, the multiplicand, or the multiplicand shifted one place to the left respectively.

If the bit pair is 11, however, this has a value of 3 which cannot be obtained merely by shifting. In order to generate the three, four times the multiplicand is added to the partial product and one times the multiplicand is subtracted. This is accomplished by having the MDG 73 transmit a carry signal, referred to on the above table as the "Carry Out," to the next bit pair to be examined. This carry has a weight of $2^2$ or 4 in relation to the bit pair presently being evaluated. In order to subtract one times the multiplicand from the partial product of the MDG 73, the MDG 73 transmits an enable signal to the MSG 55 to gate out the 2's complement of the mantissa of RGR 47 which is added to the partial product.

Thus the MDG 73 generates each bit pair examined, for example, to enable signal to the MSG 55 to gate out the proper multiple of the mantissa of the multiplicand and possibly "carry out" to the next bit pair to be examined.

For each bit pair, the MDG 73 looks at the bit pair itself and possibly a "Carry In" signal from the previous bit pair examined. This "Carry In" signal has a weight of $2^0$ or 1 for the bit pair under consideration which is equivalent to a weight of $2^2$ or 4 for the previous bit pair examined.

For each eight bit segment of the multiplier examined by MDG 73 there are four sets to enable signals to the MSG 55 which cause the MSG 55 to gate out Words 1, 2, 3 and 4 consecutively to the CSA's. The three inputs to CSA1 101 come from the 48 bit mantissa of RGA 79 which is wired in shifted eight places to the right, Word 1 which is wired in shifted seven places to the right, and the most significant 48 bits of RGC 81 which represent a portion of the carry output of CPA 77 when it is acting as CSA4. In the second clock time during which the first 8 bit segment of the multiplier is examined in MDG 73 the contents of RGC 81 are 0.

The sum and carry outputs of CSA1 101 are wired into SCA2 103 with the sum bits being wired directly in and the carry bits being wired in one place to the left. Word 2 is transmitted to CAS2 103 wired five places to the right from the MSG 55 in response to the second set of enable signals from the MDG 73. Word 2 is wired in in this position since it represents the multiplication by the fourth and fifth bits of the multiplier. The sum and carry bits of CSA2 103 are inserted into CSA3 105 with the sum bits going directly in and the carry bits again being wired one place to the left. At the same time, Word 3 from the MSG 55 is also inserted into CAS3 105 shifted three places to the right in response to the third set of enable signals from the MDG 73. The sum output of CSA3 105 is wired directly into the CPA 77 which acts as CSA4 during most of the multiplication operation and the carry bits are again wired one place to the left. Word 4 is wired into CSA4 107 one place to the right.

The 56 bit carry output from the CPA 77 is transmitted to RGC 81. The 8 least significant sum bits from CPA 77 are inserted into the 8 most significant mantissa bits of RGB 69 which are vacant since the mantissa of RGB 69, the multiplier, has been shifted 8 bits to the right. The other 48 sum bits of the CPA 77 are inserted into the 48 mantissa bits of RGA 79. The next 8 bits of RGB 69 are then inserted into the MDG 73 and the mantissa bits of the RGB 69 are shifted another 8 places to the right.

The operations performed during the second clock cycle are then repeated in the third through the seventh clock cycles except that during the sixth clock cycle only seven bits of the multiplier are left to be inserted into the MDG 73 and during the seventh clock cycle nothing is inserted into the MDG 73 and the mantissa bits of RGB 69 are not shifted further. During each of these clock cycles the mantissa of RGA 79 and the most significant 48 carry bits in RGC 81 are inserted into CSA1 101; the carry bits being wired in shifted one place to the left of the mantissa of RGA 79.

While the iterative cycles of the multiplication are being performed, occurring during the third through the seventh clock cycles, the 8 least significant carry bits which are still in RGC 81 and the 8 least significant sum bits from the last clock cycle which are in the most significant mantissa bits of RGB 69, are added in the CPA 77 and inserted into the next 8 less significant mantissa bits of RGB 69 which have been vacated since RGB 69 has been shifted another 8 bits to the right. This portion of the multiplication is finished since there are no more partial products to be added to these bits. The finished portion of the product is shifted 8 bits to the right along with the multiplier mantissa on each iterative cycle.

The fact that there are only 7 multiplier bits transferred to the MDG 73 on the last iterative cycle has the beneficial effect of preventing the carry out from the most significant bit pair of the multiplier when it is examined by MDG 73.

On the eighth clock cycle the 56 carry bits in RGC 81 and the 56 sum bits in RGA 79 and RGB 69 are transferred to the CPA 77 with the carry bits being wired in shifted one place to the left in respect to the sum bits. The CPA 77 adds the two acting as a carry propagate adder propagating the carry by means of the Carry Look Ahead (CLA) 109. The most significant 48 bits of the sum are inserted into the mantissa of RGA 79 and the other 8 bits into the most significant bits of the mantissa of RGB 69. Thus the result of the multiplication is stored in RGA 79 and RGB 69 with the most significant 48 bits of the product mantissa being stored in RGA 79 and the 48 least significant bits being stored in RGB 69.

An article by O. L. McSorley entitled "High Speed Arithmetic in Binary Computers," which appeared in the January 1961 issue of the Proceedings of the IRE, has relevance to the structure and operation of the CPA 77. The article by C. S. Wallace entitled "A Suggestion for a Fast Multiplier," which appeared in IEEE "Transactions on Electric Computers," VEC–13, February 1964, is relevant to the structure and operation of the multiplying scheme. "The Logic of Computer Arithmetic" by Ivan Flores, pages 154–167, published by Prentice-Hall, Inc., in 1963, is also of interest in relation to the use of the carry save adders, in a computer multiplier.

32 bit multiplication is performed in much the same fashion as 64 bit multiplication except that it only takes half the number of clock times to multiply two numbers since the mantissas are only half as long. If both the inner and outer numbers are to be multiplied, the outer multiplication is performed first and the first step of the inner multiplication is overlapped with the last step of the outer.

The illustrated embodiment of this invention can also perform division both in the 32 and 64 bit mode. At the beginning of the division the divisor is in RGR 47 and the dividend, which is double length in order to preserve precision, appears in RGA 79 and RGB 69 when operating in the 64 bit mode. In the 32 bit mode the most significant halves appear in RGA 79 and the least significant half appears in RGB 69.

64 bit mode division is performed in 55 clock times. During the first clock time RGC 81 is cleared and the exponent and sign of the divisor are transferred from RGR 47 to RGB 69. During the second clock time the exponent of RGB 69 is subtracted from the exponent of RGA 79 and the result is placed in the exponent field of RGA 79. The sign bits of RGA 79 and RGB 69 are compared and the proper sign of the quotient is placed in the sign bit of RGA 79. Also, during the second clock time a 63 bit end around right shift instruction is placed in a shift register which forms a part of the BSW Controls 83. This shift is equivalent to a shift left of one end around.

The third through the forty-ninth clock cycles are the iterative cycles during which the quotient is formed one bit at a time in RGB 69. During each of these iterations the complement of the mantissa of RGR 47 is transferred to the CPA 77 by gating out the complement of the mantissa of RGR 47 to the MSG 55 and having the MDG 73 give the Word 4 x 2 enable signal to the MSG 55. The Word 4 x 2 from the MSG 55 to CPA 77 is a direct path which transfers the output of RGR 47 into the CPA 77 in the same position that it was in RGR 47 with bits 16 of RGR 47 being transferred to bit 16 of the CPA 77. The mantissa of RGR 79 is also transferred to the CPA 77 by a direct path.

The CPA 77 then subtracts the mantissa of RGR 47 from the mantissa of TGA 79 by adding the complement of RGR 47 to RGA 79. This is a one's complement subtraction so that if the remainder is positive, i.e., if the mantissa of RGA 79 is greater than the mantissa of RGR 47, there is a carry out of the most significant bit of the addition. This carry bit is added to the result, the partial remainder, in order that it will have the correct magnitude. The remainder is then transferred to the RGA 79 from the CPA 77 by a direct path which is wired in such manner that the partial remainder is shifted one place to the left.

If there is no carry out of the most significant bit of the one's complement, subtraction in the CPA 77, the partial remainder is negative and the subtraction is improper. At the same time that the mantissa of RGA 79 is transferred to the CPA 77 to be added to the complement of RGR 47, the mantissa of RGA 79 is also inserted into CSA1 101. Since RGC 81 and Words 1, 2 and 3 are all "0," the mantissa of RGA 79 goes straight through the PAT 75 and appears at the output of CSA3 105. If the partial remainder is negative, it is not transferred to RGA 79 but the old partial remainder is returned to RGA 79 by means of a direct path from CSA3 105 which wires the old mantissa of RGA 79 back into RGA 79 shifted one place to the left.

Next, the most significant mantissa bit of RGB 69 is transferred to the least significant bit of the RGA 79 and the mantissa of RGB 69 is transmitted through the LOG 71 to the BSW 51 where it is shifted left one place and replaced in RGB 69.

If the remainder is positive, a ONE quotient bit is generated and inserted into the least significant bit of RGB 69. If the remainder is negative, then a ZERO is placed in the least significant bit of RGB 69.

This iteration occurs forty-seven times between the third and forty-ninth clock cycle resulting in 47 bits of quotient appearing in RGB 69. If the most significant quotient bit, which at this point is in the seventeenth bit position of RGB 69, is a ONE then the divident is larger than the divisor and this most significant bit has a weight of $2^0$ or 1. Since the most significant bit of the floating point mantissa format has a weight of $2^{-1}$ it is necessary to normalize the quotient. This is accomplished by adding one to the exponent of RGA 79 in the fiftieth clock time. In the fifty-first clock time the iteration is repeated one more time if the most significant bit of the quotient was ZERO. If the most significant bit of the quotient was ONE, nothing is done during this clock time.

The least significant quotient bit is generated in the fifty-second clock time by again subtracting in the CPA 77 the mantissa of RGR 47 from the partial remainder which appears in the mantissa of RGA 79 and transferring the remainder directly to RGA 79, if the remainder is positive. If the remainder is negative, the subtraction is not performed and the old remainder is left in RGA 79. The mantissa of RGB 69 is again shifted one place to the left and replaced in RGB 69 and the least significant quotient bit is placed in the least significant bit of RGB 69. At this point, the quotient appears in the mantissa portion of RGB 69 and the remainder appears in the mantissa portion of RGA 79. In the fifty-third clock time the mantissa of RGA 79 and RGB 69 are swapped. During the fifty-fourth and fifty-fifth clock cycle the contents of RGA 79 are normalized if ordered by the CU.

32 bit division is performed in a similar fashion to 64 bit division except that it is necessary to shift numbers around in order that the operation be performed properly. These shifting operations cause the 32 bit division to take somewhat more than half the number of clock times as the 64 bit division. If both the inner and outer numbers are to be divided, the inner division is performed first.

Addition and subtraction are both performed in the CPA 77. The operands are originally stored in RGA 79 and RGB 69 and the answer is stored in RGA 79. Addition requires 5 clock times. During the first clock time the difference of the exponents is taken by the use of the CPA 77. In the second clock time the mantissa of the smaller operand is shifted to the right a sufficient number of places to equalize the exponents, and in the third clock time the mantissas are added in the CPA 77. During the fourth clock time, the mantissa is shifted in order to normalize it. During the fifth clock time the number equal to the number of places that the mantissa has been shifted to the right or left is added to or subtracted from the exponent.

The steps of the addition use the CPA 77 and the BSW 51 on alternate clock cycles. Therefore, it is possible on a 32 bit addition to perform addition or subtraction in both the inner and outer numbers in an overlapped fashion whereby first clock cycles the outer addition or subtraction is begun at the second clock cycle of the inner addition or subtraction, thereby requiring six clock times in all to perform both inner an outer addition or subtraction.

In addition operations the signs of the number may be the same or different. If they are the same, the mantissas are added in the CPA 77 and the sign of the sum is the same as the number being added. If the signs are different, the mantissa of RGB 69 is complemented and the mantissas are added in the CPA 77. If the answer is positive, the mantisa of RGB 69 was smaller than the mantissa of RGA 79 and the answer is in the correct form. The sign of the sum is the sign of RGA 79.

If the result is negative (i.e., if there is no carry out of the most significant bit of the addition in the CPA 77), the answer is in the complement form and its complement must be taken to get the true answer. The sign of sum is the opposite of the sign of the RGA 79.

In subtraction the minuend is placed in RGA 79 and the subtrahend in RGB 69. To perform the subtraction the sign of RGA 79 is changed and the operation is treated as an addition.

Besides the four basic mathematical operations described above, the hardware in the processing element may also be used to perform logical operations such as OR, AND, or Exclusive Or.

Each location in a PEM is characterized by an 11 bit address. The PEM is addressed by means of the Memory Address Register (MAR) 91 which is a register similar in structure to RGC 81 and RGS 87 in that it includes only latches but is 16 bits wide. The extra five bits are included merely for packaging considerations and are not used in this embodiment of the invention on the PE level, however, if the memory associated with the PE were enlarged so that longer addresses would be necessary, the extra bit places could be utilized.

Information is inserted into the MAR 91 through the ADA 65 which is similar in structure to CPA 77 except that it is only 16 bits wide. The ADA 65 receives inputs from OSG 49, RGS 87 and RGX 93. Memory addresses are usually inserted by the CU by means of the CDB 59 through the OSG 49. The memory address from the CU may be incremented by the number stored in RGX 93 or RGS 87 which may be used as index registers. This indexing capability in the PE allows it to modify the address broadcast by the CU in accord with its internal conditions so that the correct address in its own PEM is addressed by the MAR 91. Data is written into the memory address selected by the MAR 91 through the output of the LOG 71 which goes to the Memory Information Register (MIR) 57. The operand may be received from the memory address specified in the MAR 91 at the input to the OSG 49 coming from the MIR 57.

The Mode Register (RGM) 63 is an 8 bit register in which the bits may be individually cleared and set by the CU. It may consist of a set of 8 latches, one for each bit. It contains two enable bits E and E1, two fault bits F and F1, and four test bits I, J, G and H.

The E and E1 bits determine whether the PE is enabled or not. Setting the E or E1 bits enables the outer or inner 32 bit mode respectively. In the 64 bit mode the E and E1 bits are tied together and either set or cleared simultaneously. The E bits are connected through buffers to some of the registers and if the E or E1 bit is not set, the clear and load enable signals from the CU for the 32 bit outer or 32 bit inner portions of the register respectively are blocked. Therefore the contents of these registers cannot be destroyed.

The E bit protects the outer portion of RGA 79 and RGB 69 and all of RGS 87. The E1 bit protects the inner portions of RGA 79 and RGS 87.

There also exists unconditional load and clear enable paths from the CU to RGA 79 for use during 32 bit mode division when it is necessary to use both halves of RGA 79 for the storage of the double length dividend. In this case, the contents of the disabled portion of RGA 79 are destroyed. In 32 bit multiplication it is also necessary to use both mantissa portions of RGA 79 for storage of the double length product. The contents of the disabled portion of the RGA 79 are saved, however, in RGR 49 and are reinserted into the RGA 79 at the completion of the operation.

The F and F1 bits are fault bits. The F bit indicates a fault in the 64 bit mode or in the 32 bit outer portion and the F1 bit indicates faults in the 32 bit inner portion. The fault bits are set by errors such as exponent overflow, mantissa overflow, or when the divisor in a division operation has a zero in its most significant bit.

The G, H and J bits are test bits used for intermediate storage of results of a test such as greater than, less than, equals zero or one. The I and J bits are used for 64 bit mode tests or 32 bit outer mode tests. The G and H bits are used for a 32 bit inner test.

The bits in the mode register may be set or read individually by the CU through the Receiver and Driver 89 and Mode Logic 111 or set in parallel through the OSG 49 via the Common Data Bus (CDB) 59. The Mode Logic 111 is also used to perform logical operations on the bits in the mode register in response to conditions within the PE. For instance, one of the test bits may be set by a test such as "is the mantissa of RGA 79 larger than the mantissa of RBG 69?," and whether this test bit is set or not may be used to effect the E bits. That is, the result of the test may be used to enable or disable part or all of the PE. The Mode Logic 111 can perform AND, OR, exclusive Or operations on the bits in the RGM 63. This power greatly increases the flexibility of the system.

The use of the BSW 51 for all shifting and normalization operations rather than shift registers is very important in an array system since it allows an operand to be shifted any number of places either to the right or left in the same small amount of time. Thus, for instance, in normalization, when the magnitude of the number varies from PE to PE, all the PE's finish the normalizing together and one is not forced to wait for another.

Processing element memory

Each PE in the array has a Processing Element Memory (PEM) associated with it which, in the illustrated embodiment of the invention, is a 2048 word thin film memory. The PEM acts both as a memory for the PE and as a portion of the memory for the CU.

The CU fetches its instructions and can fetch data from the PEM's of the array 8 words at a time, one word per PUC 39. When the quadrants are operating independently the CU takes its first 8 words from a first location in the PEM's of the PE #0X of each of the 8 PUC's, as illustrated in FIG. 3 of the drawings, the second 8 from the same location in the PEM's of the PE #1X, and so on to the PEM's of PE's #7X where "X" takes on integer values between 0 and 7. The CU goes back to the next location in the PEM's of the PE's #0X for the ninth block of words and cycles through the array in like fashion for each 8 word block.

If two or more quadrants are operating together as a single array, and the program storage is shared among the quadrants, the next block of instructions after that from the PEM's of the PE's #0X of the first quadrant appear in the PEM's of PE's #0X of the next quadrant. When operating in a multiquadrant mode the CU which reads the instruction block from its PEM's causes its CU Buffer (CUB) which form a portion of the PUB's to broadcast it to the corresponding CUB's of the other quadrants.

Figure 6:
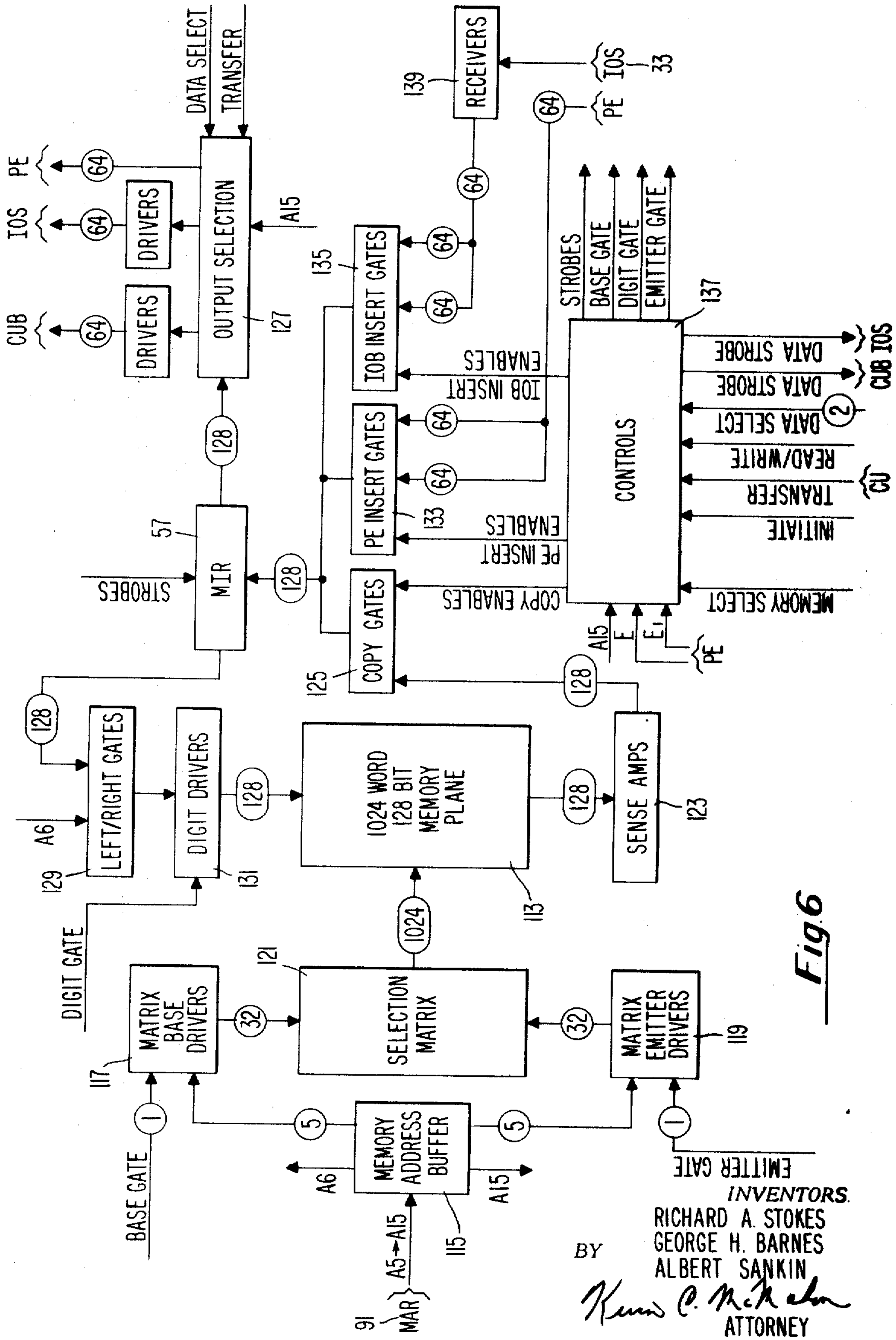
FIG. 6 is a block diagram of a processing element memory.

Referring to FIG. 6 of the drawings the Memory Plane 113 in this embodiment of the invention may be a 1,024 word, 128 bit thin film memory plane similar in structure to that disclosed in the application by Jones et al., Ser. No. 483,096, filed Aug. 23, 1965, and assigned to the assignee of the present invention. For purposes of the present system, the 128 bit words are broken up into two 64 bit words which may be referred to as the odd bits and the even bits. The 11 bit address of the memory location to be written into or read out of, shown as A5 through A15, is loaded into the Memory Address Register (MAR) 91, FIG. 5A, of the associated PE.

Once in the MAR 91 the address is buffered in the Memory Address Buffer 115 and separate 5 bit segments are transmitted to the Matrix Base Drivers 117 and Matrix Emitter Drivers 119 for controlling their operation. The other bit of the PEM address, which in FIG. 6 is designated A15, determines whether the odd or even bits of the memory word are to be acted upon.

The Matrix Base and Emitter Drivers 117 and 119 in turn control the operation of the Selection Matrix 121 through 32 lines each. The Selection Matrix 121 may be a 32 x 32 transistor matrix having an output of 1,024 select lines to the Memory Plane 113 for selecting the word specified in the PEM address.

The PEM Memory Plane 113 operates on a destructive read-out principle. In reading operations, the 128 bit word in the memory location specified in the address is read out of Memory Plane 113 and inserted into the MIR 57 through the Sense Amplifiers 123 and the Copy Gates 125. The word in the MIR 57 appears at the input of the Output Selection 127 and either the even or the odd bits, depending on the value of A15, are gated through to either the Control Unit Buffer (CUB), the IOS 33 or the PE. The entire 128 bit word is then re-inserted from the MIR 57 into the same memory plane location that it was read out of through the Left/Right Gates 129 and the Digit Drivers 131.

If it is desired to write a word into memory from the PE or the IOS 33, only half the word from the Memory Plane 113, the even or the odd bits, is enabled through the Copy Gates 125 into the even or odd bit portion, respectively, of the MIR 57. The 64 bit word from the PE or IOS 33 is enabled into the other portion of the MIR 57 through their respective Insert Gates 133 and 135. The 128 bit word is then written into the Memory Plane 113 through the Left/Right Gates 129 and the Digit Drivers 131.

The PEM receives 64 bit inputs from the IOS 33 through Receivers 137 and from the PE for writing words into memory. Each of the inputs are "doubled up" at the inputs of the 128 bit wide PE and IOS Insert Gates 133 and 135 so that they may be written into either the odd or the even bits of the MIR 57.

Figures 7, 8:
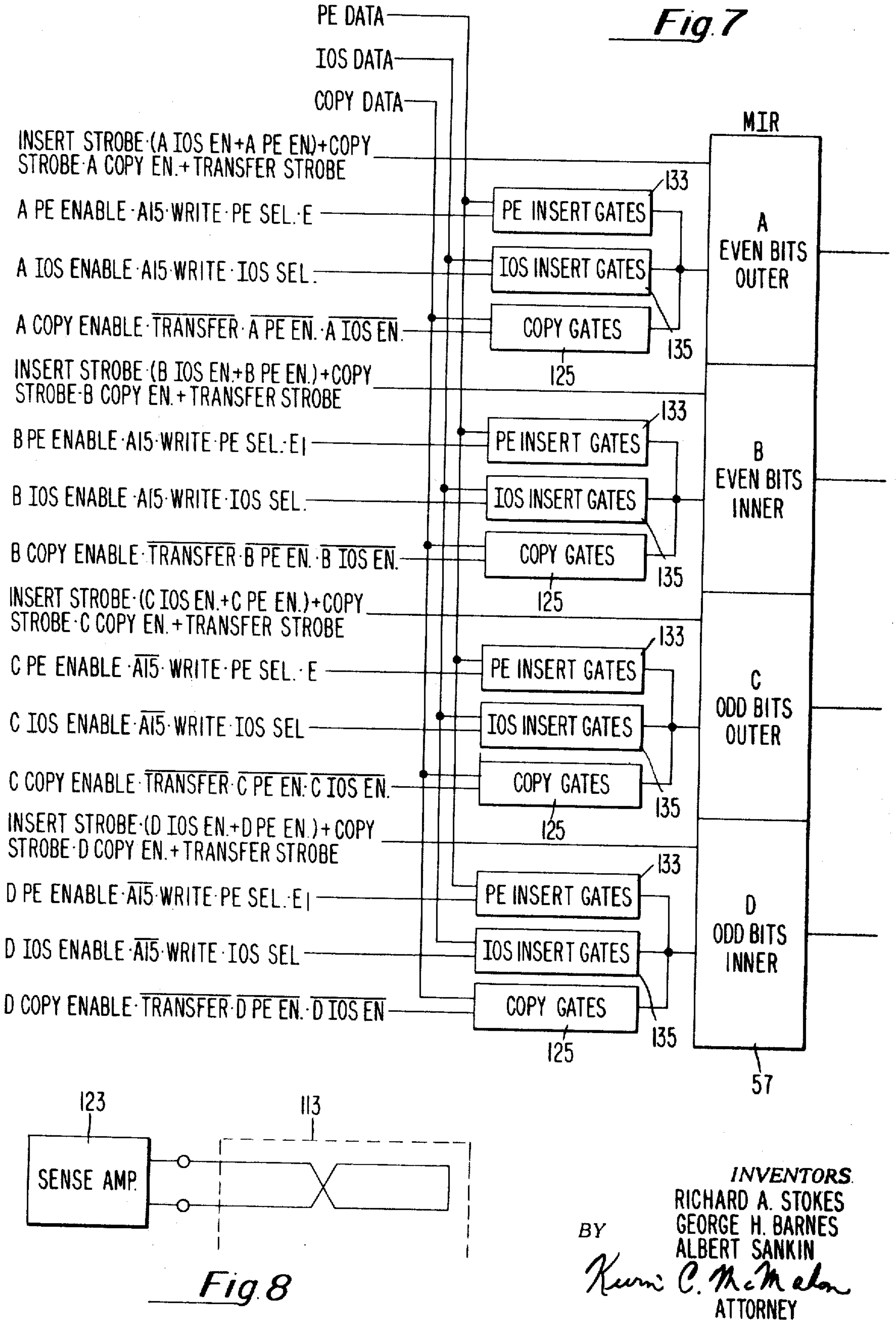
FIG. 7 is a block diagram of the memory information register in the processing element memory.
FIG. 8 is a schematic diagram showing the layout of a sense line in the memory plane.

In order to write a word into the MIR 57 it is necessary to have the proper enable and strobe signals occur in unison. Referring to FIG. 7 of the drawings, the MIR 57 and the Copy and Insert Gates 125, 133 and 135 are each 128 bits wide and are broken down into four sections: the inner and outer portions of the even bits and the inner and outer portions of the odd bits, labelled in the MIR 57 as A, B, C and D, respectively. The breakdown into inner and outer bit portions is necessary for when the PE's are operating in the 32 bit mode.

The Copy Gates 125 and the PE and IOS Insert Gates 133 and 135 blocks shown in the drawing are each a 32 bit wide set of AND gates. One input to the sections of the Copy Gates 125 receive the corresponding portions of the data from the Sense Amplifiers 123 while one input of the sections of the PE and IOS Insert Gates 133 and 135 receive the inner or the outer bits from the PE or IOS Data Inputs.

In order to read data into the MIR 57 it is necessary to have the proper insert strobe signals to the MIR 57 and enable signals to the other inputs of the PE, IOS Insert or Copy Gates. These strobe and enable signals are operated by the Controls in response to the signals from the CU and the PE. The signals which must be present at the inputs of the Controls 137 and generated within the Controls 137 for generating each strobe and enable signal are written at the various inputs in FIG. 7. For instance, in order for the strobe input to the A portion of the MIR 57 to be present, it is necessary to have the Controls 137 generate either an Input Strobe with an A portion IOS enable or an A portion PE enable signal, or, a Copy Strobe with an A Copy Enable signal, or a Transfer Strobe. In order to write data into the MIR 57 the A portion of the PE Insert Gates it is necessary to have a PE Enable Signal a ONE A15 signal, a Write signal on the Read-Write line, a "PE" signal from the Data Select Input to the Controls, and the E bit must be a ONE. In order to write Copy Data into the A portion of the MIR 57, the A Copy Enable Signal must be present and the Transfer, the A PE Enable and the A IOS Enable signals must not be present.

If it is desired, for example, to write a 64 bit PE word from the LOG 71 of the PE into the odd bits portion of a location in the MIR 57, the outer and inner portions of the word appear at PE Insert Gates 133 for the outer and inner portions, respectively, of the MIR 57. At the same time the 128 bit word in the location in the Memory Plane 113 to be written into is selected by one of the output lines of the Selection Matrix 121, read by the Sense Amplifiers 123 and appears at the input to the Copy Gates 125.

The Insert Strobe, the Copy Strobe, the A Copy Enable, the B Copy Enable, the C PE Enable, the D PE Enable, the PE Select signal and the E and E1 bits are generated in the Controls 137 or by the PE. When the Strobe and Enable signals are generated, the A and B portion of the MIR 57 receive the even bit portion of the word read from the memory plane through the Copy Gates 125 and the C and D portions of the MIR 57 receive the word from the PE. The word is then read into the Memory Plane 113 at the desired location through the Left/Right Gates 128 and the Digit Drivers 131.

The sense lines from the Sense Amplifiers 123 are wired into the Memory Plane 113 (FIG. 6) in a folded fashion as shown in FIG. 8 of the drawings to provide noise cancellation. Therefore, in order to read the true of the data words located on the right side of the Memory Plane 113, it is necessary to write the complement of the data since the current in the sense line is going in the opposite direction from what it is on the left side of the Memory Plane 113. For this reason, the Left/Right Gates 129 are provided to write either the true or the complement of the data into the Memory Plane 113 depending on whether the memory location is on the left or right side of the Memory Plane 113. The action of the Left/Right Gates 129 is controlled by one of the bits of the memory address, designated as A6 in FIG. 6. A6 is "ZERO" for the memory locations on the right side of the Memory Plane 113 and "ONE" for the memory locations on the left side of the Memory Plane 113.

The output of the MIR 57 is directly connected to the input of the Output Selection Gates 127 over a 128 bit wide path. Either the odd or the even bits of the word in the MIR 57 may be gated either to the CUB or the IOS 33 through drivers or to the OSG 69 of the PE directly. The destination of the output data is determined by the 2 bits Data Select Signal from the CU. Bit A15 in the address determines whether the odd or even bits are gated through the Output Selection 127.

The Controls 137 contain the timing and logic circuitry for generating enable and strobe signals at the proper times and in the proper sequence for operating the PEM. The Controls 137 receive 6 input lines from the CU. The Memory Select lines determine the memory to be written into the read out of. The Initiate Line receives the pulse from the CU which initiates the memory cycle. All of the control signals from the Controls 137 are timed from this initiate pulse. One possible method for providing the timing for the pulses is to provide a tapped delay line in the Controls 137 and pick off the desired enable and strobe signals at points along the delay line. The Read/Write line determines whether the memory is to perform a read or write operation. The Data Select lines determine either the source or the destination of the information when the PEM is in a write or a read cycle, respectively. If the Transfer Line to the Controls 137 is set, data may be transferred from the PE to the CUB without requiring a memory cycle. The Controls 137 also receive inputs from the E and E1 bits of the associated PE and the A15 address bit.

The outputs from the Controls 137 include enable signals to the Copy Gates 125, the PE Insert Gates 133 and the IOS Insert Gates 135 and strobe signals to the MIR 57. The Base and Emitter Gate signals go to the Matrix Base and Emitter Drives 117, 119 respectively, and enable them to cause the Selection Matrix 121 to select the location in the Memory Plane 113 specified in the address. The Digits Gate signal goes to the Digit Drivers 131, enables them to write the word in the MIR 57 into the location in the Memory Plane 113 specified by the Selection Matrix 121. The Controls 137 also emit Data Strobe signals ot the CUB and to the IOS 33 which tell them when to read data from the Output Selection.

If data is to be transferred from the PE to the CUB without a memory cycle, the Transfer Line is set and the data is read from the PE through the PE Insert Gates 133 into the odd bits of the MIR 57 in response to the proper PE Insert Enable and strobe signals. The data is then transferred through the Output Selection 127 to the CUB in response to the Transfer signal.

Control unit

The Control Unit (CU), see FIGS. 9A through 9E, is broken down into four parts, the Advance Station (ADVAST), the Instruction Look Ahead (ILA), the Final Station (FINST) and the Memory Service Unit (MSU). The ADVAST receives instructions, one at a time, from the Instruction Word Storage (IWS) 141 of the ILA. The IWS 141 is a 64 word memory each word being 64 bits, which is loaded from main memory (i.e., the PEM's) and controlled by ILA. The IWS 141 is broken down into eight blocks of eight words each, each word containing two 32 bit instructions. The instructions are processed from IWS 141 to the ADVAST Instruction Register (AIR) 143 where ADVAST determines the type of instruction it is.

There are two types of instructions: ADVAST and FINST instructions. ADVAST instructions are executed within the CU and they are distinguished by the fact that their bit zero is a logical ZERO. FINST instructions control the operation of the PE's and have bit zero equal to a logical ONE. FINST instructions are examined in ADVAST to determine if indexing of the address field of the instruction is required. The contents of the address field may be a memory address or may signify route distances, shift amounts or transfer operations for transferring operands between registers.

If the instruction in the AIR is an ADVAST instruction it is decoded by the ADVAST Instruction Decoder (AID) 145 to determine the operations to be performed in its execution. Each instruction has a certain execution time which is determined primarily by the number of transfers required and the number of microsequences to be performed. The ADVAST Instruction Timer (AIT) 147 determines the required number of clock times for each portion of the instruction. The decoded instruction from AID 145 and the instruction timing from AIR 147 are combined in control logic (not shown) for generating a whole set of subcommands for controlling the operation of the ADVAST portion of the CU.

If the instruction in the AIR 143 is a FINST type instruction, the ADVAST merely transmits it from the AIR 143 to the FINST Instruction Queue (F10 through F17) 149 of the Final Station.

Generally, there is associated with each FINST instruction a 64 bit operand which may be either the contents of one of the four Accumulator Registers (AC0 through AC3) 151 unmodified, or combined with the 16 least significant bits of the AIR 143. The different possibilities for the operands associated with instructions are either the 64 bit contents of one of the Accumulator Registers 151 unmodified, the 48 most significant bits of the Accumulator Register 151 and the 16 least significant bits of the AIR 143 or the 48 most significant bits of the Accumulator Registers 151 and the sum of the 16 bits from the AIR 143 and 16 least significant acumulator bits. This 64 bit operand is stored in the FINST Data Queue (FD0 through FD7) 153.

The FINQ 149 and the FINST Data Queue 133 are each 8 register Queues which hold a stack of up to 8 FINST type instructions and operands associated with them, respectively, and act as a buffer between the ADVAST and the instruction execution portion of FINST. Their purpose is to allow simultaneous control of the Control Unit and the PR array.

The instruction stream transmitted by the IWS 141 to the AIR 143 is a mixture of ADVAST and FINST type instructions. The FINST instructions are passed through ADVAST and stacked in the FINQ 149 and the operand or PEM address associated with them are stacked in the corresponding one of the FINST Data Queue 153 registers. In this way the ADVAST and FINST do not have to wait for each other and the system efficiency is greatly increased.

The FINST Load Pointers (FLP) 155 and the FINST Read Pointers (FRP) 157 are 8 bit shift registers which are used to select the next register in the FINQ 149 and FINST Data Queuer 153 to be loaded by ADVAST or ready by FINST, respectively. The Queue register selected by the FLP 155 and FRP 157 are compared in the FINST Comparer Equal (FCE) 159. When they are equal, the Queues are either empty or full, depending on which one has caught up with the other, and either ADVAST or FINST must wait for the other. A signal is sent to the control logic to either prevent ADVAST from loading any more instructions into the FINQ 149 or to stop FINST.

Once an instruction is in the FINQ 149 and the operand is stored in the FINST Data Queue 153, the instruction is executed by the FINST. The execution consists primarily of determining the type of instruction and the subcommands so generated by the FINST for transmission to the PE's. At any clock time during the execution of the instruction there may be any number of subcommands which must be generated in parallel. The instruction is taken from the FINQ 149 through the Operand Select Gates FIF 161 or FIH 163 and inserted into the FINST Instruction Register (FIR) 165. From the FIR 165 the instruction is transmitted to the FINST instruction Decoder and Timer (FID) 167 which generates the necessary sets of subcommands at each clock time, the timing being determined by the FINST Timing Counter (FCC) 169. The sets of subcommands are stored in FINST Command Register (FCR) 171 for one clock time for synchronization purposes and are broadcast to the PE's through Drivers (FCD) 173 on the following clock time.

The PE's receive a set of subcommands which enable the loading of or reading from registers or control the operation of the Barrel Switch 51, FIG. 5B, etc. In the illustrated embodiment of the invention there are approximately 260 different sets of subcommands which may be transmitted to the PE's for executing instructions. All of the subcommands are set to the 64 PE's in parallel.

The Common Data Bus (CDB) 59, FIG. 5A, connects the FINST Data Drivers (FDD) 175 through the PUB 41 to the Operand Select Gates (OSG) 49 of the PE's for broadcasting 64 bit operands to the 64 PE's of the array. The source of these operands can be either a 64 bit word from the FINST Data Queue 153 or a 16 bit PEM address from the Memory Service Unit (MSU). For PE type instructions there also may be a 16 bit PEM address from the FINST Data Queue 153 used to fetch or store operands between the PEM's and the PE's. In order to address the PEM's the address is transmitted by MSU through the FINST Operand Select Gates (FDS) 177 and Drivers (FOD) 175 whose output goes to the CDB 59.

The CDB 59 is shared by the FINST, and the users of the memory and its usage must be interlaced among them. The users of the memory include the I/O, the ILA for fetching instructions and the FINST for fetching or storing operands to memory for ADVAST or for the PE's. Access to the CDB 59 is tightly controlled and in each clock time it is established if it is available and who can use it next. Once a user has been given access to the CDB 59 it keeps it for the length of time required to transfer its information into the PE or PEM. This may take several clock times. The priority in using the CDB 59 is on a first come, first served basis.

The FINST includes a novel overlap feature which allows it to have the FINST overlap the execution of an instruction which does not include a path to the CDB 59 with another instruction which does use the CDB 59. While executing an instruction in the FIR 165 and FID 167 the FINST Overlap Decoder and Timer (FOD) 179 decodes the next instruction in the FINQ 149 to see if it uses the CDB 59. If it does, and if the instruction presently under execution does not use the CDB 59, during all or part of its execution, the FOD 179 causes the FDS 177 to broadcast the operand associated with the next instruction to the PE's while the first instruction is still under execution.

The amount of overlap that can be achieved varies depending on the instructions involved. The instruction presently under execution may require any number of clock times and require the use of the CDB 59 at some time during its execution. The use of the CDB 59 for the next instruction may be overlapped only with the portion of the first instruction that occurs after it finishes using the CDB 59.

Within the PE's an operand broadcast by the CDB 59 may be used as a data word to be operated upon by the PE, a data word to be stored in memory or as an address of a location in the associated PEM.

If the PE's are operating in a multiquadrant array, it is possible that the CU's are not synchronized with one another. That is, one CU could be executing instruction X while another is executing instructing $X\pm n$. The CU's continue to work independently until communication among the CU's or the PE's of different arrays is required at which time it is necessary that they be brought back into synchronism.

The memory operations are controlled by the Memory Service Unit (MSU). Each memory user desiring access to the Memory makes a request to the MSU. The users include the I/O, the FINST when it has to fetch or store operands, and the Instruction Look Ahead (ILA) when it fetches instructions for the CU. ADVAST can also fetch or store operands from and to the PEM's but must process its request through the FINST.

The interfaces with the Control Computer 27 for receiving and sending information between it and the CU are included as part of the MSU. Registers MR1 181 and MRO 183 are the input and output registers, respectively, for performing this task.

The order of priority of access, which is controlled by the Priority Logic 185, is as follows: the I/O has two priorities, a high priority and a low priority, the I/O high priority has priority over all other users. The FINST has second priority, ILA has third priority and, finally, the I/O low priority has the lowest priority. The Priority Logic 185 determines which user has access to the memory next. Its outputs consist of enable signals to the control logic (not shown) for controlling the operation of the MSU and the PEM's.

The I/O always stores or fetches 16 words at a time. The ILA fetches 8 words. The FINST, if it is ordering a fetch or store between the PEM and the associated PE, operates on 64 words at a time, one for each PE. If the FINST is fetching operands for ADVAST, it fetches either 1 or 8 words at a time, or if storing an operand from ADVAST, it stores one word.

In the embodiment of the invention being described either one, two or all four quadrants may operate together as a single array and program instructions and operands may be stored in all or any of the quadrants of the array. The fetching and storing of information from and to memory is controlled by the Configuration Control Logic which includes registers MCO 187 and MCL 189 and MC2 191 and associated circuitry. MCO 187 is a four bit array size control register, each bit of which corresponds to one of the quadrants. Each bit set indicates that the corresponding quadrant is assigned to work on the present problem and is to receive instructions and operands fetched by the CU's of the other quadrants of the array.

MC1 189 is a four bit instruction fetch register which indicates the location of the program instructions in memory. Each bit position in MC1 189 is relative to bit sets in MCO 187. For example, if all four bits are set in MCO 189 and the second and fourth bits are set in MC1, 189 the program is stored in the PEM's of the second and fourth quadrants. If quadrants #2 and 3 are operating on the problem indicated by the third and fourth bits of MCO 187 being set, and the program is stored in quadrant #3, then the second bit of MC1 189 would be set.

MC2 191 is a four bit instruction execution register whose contents are also relative to MCO 187. For ADVAST type instructions involving interquadrant communication MC2 specifies which CU's are to execute the instruction and for operand fetches it indicates in which quadrant the operand is stored. The outputs of MCO–2 go to two groups of logic labelled "No. of CU's in Array" 193 and "Which CU in Array" 195 which determines which CU's are to particuipate in the instruction fetching execution and fetching. The outputs of the logic go to the control logic (not shown) for controlling the operation of the CU.

If it is desired to change the array size during the running of a problem (i.e., by changing the values of MC0 187 and MC2 191), ADVAST stops executing instructions and the FINST is emptied by executing the instructions in it. The new values of MC0 187 and MC2 191 must be temporarily stored in another register until FINQ 153 is emptied.

The format of the 24 bit main memory address received by the MSU from the ADVAST or the ILA varies depending on the number of quadrants in the array in which the program or operands are stored. The following formats are possible:

(1) One Quadrant

0–17 18–23 where bits 0–17 specify the Memory Plane 113 location in the PEM's and bits 18–23 specify the PUC 39 and PEM number.

(2) Two Quadrants

0–16 17 18–23 where bits 0–16 specify the Memory Plane 113 location; bit 17 in conjunction with the Configuration Control Logic specifies the quadrant for the instruction or operand fetch, respectively, and bits 18–23 specify the PUC 39 and PEM number.

(3) Four Quadrants

0–15 16 17 18–23 where bits 0–15 specify the Memory Plane 113 location; bits 16 and 17 specify the quadrant number and bits 18–23 specify the PUC 39 and PEM number.

On an ILA or a FINST memory operation bits 0–20 of the 24 bit address is gated through the Operand Select Gates MAB 197 and Operand Select Gates MAA 199 to be stored in the Memory Address Register (MSA) 201 during the memory operation. Bits 21–23 are inserted directly into the MSA 201 from FINST. The MAA 199 also receives address inputs from the I/O through the receiver MRA 203.

Figures 9, 9E:
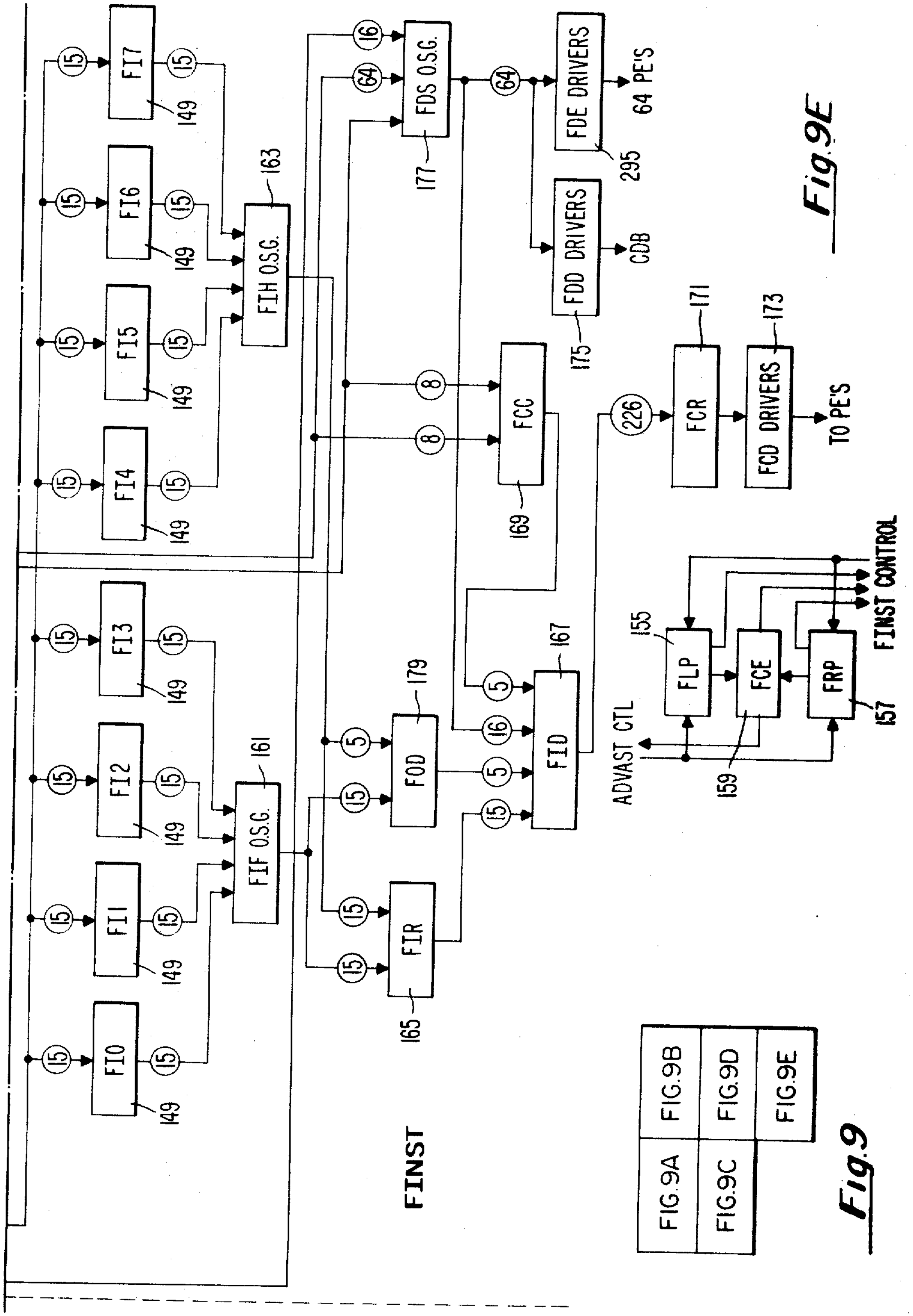
FIG. 9 is a diagram illustrating the interrelation among FIGS. 9A–9E.
FIG. 9A–9E is a block diagram of a control unit.
Figure 9A:
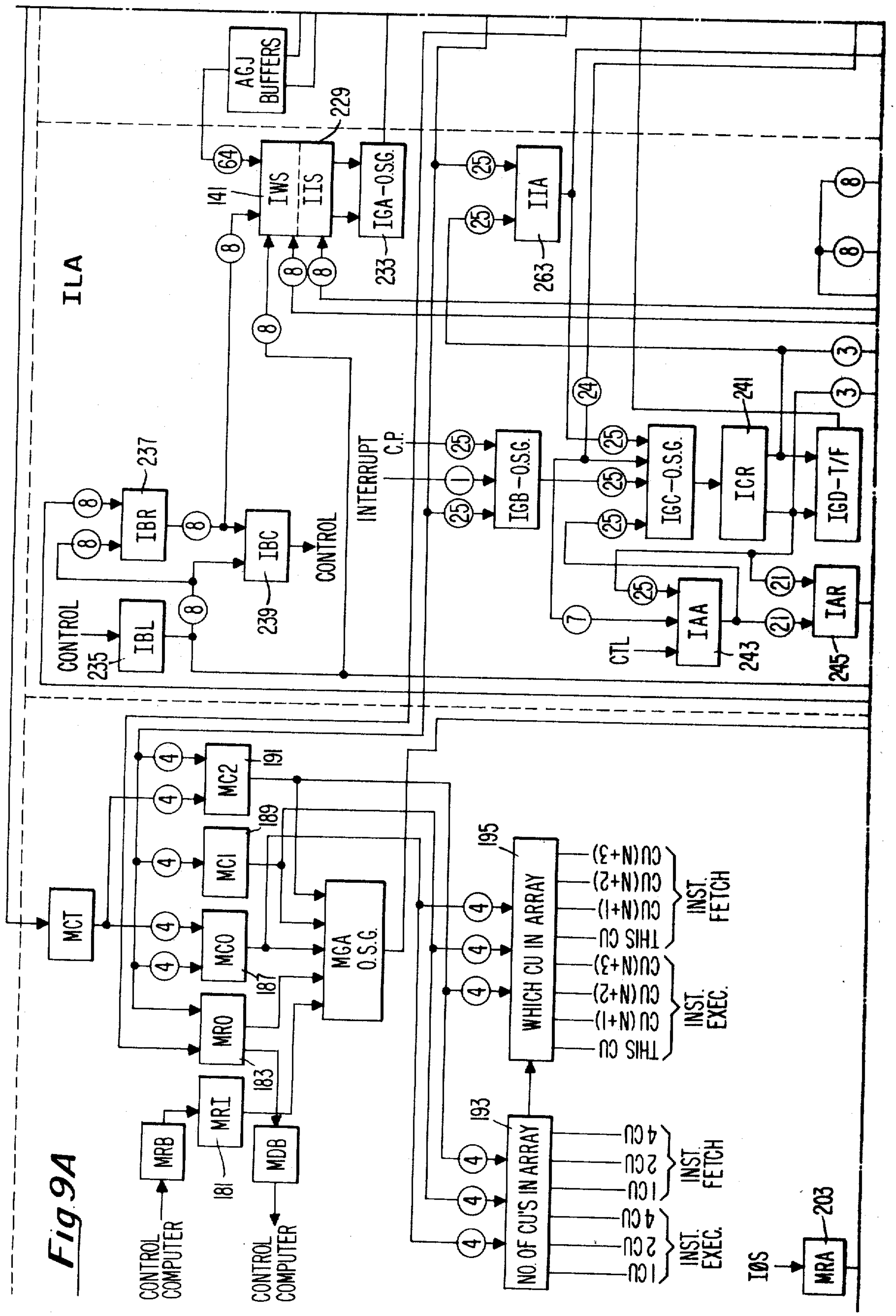
Figure 9B:
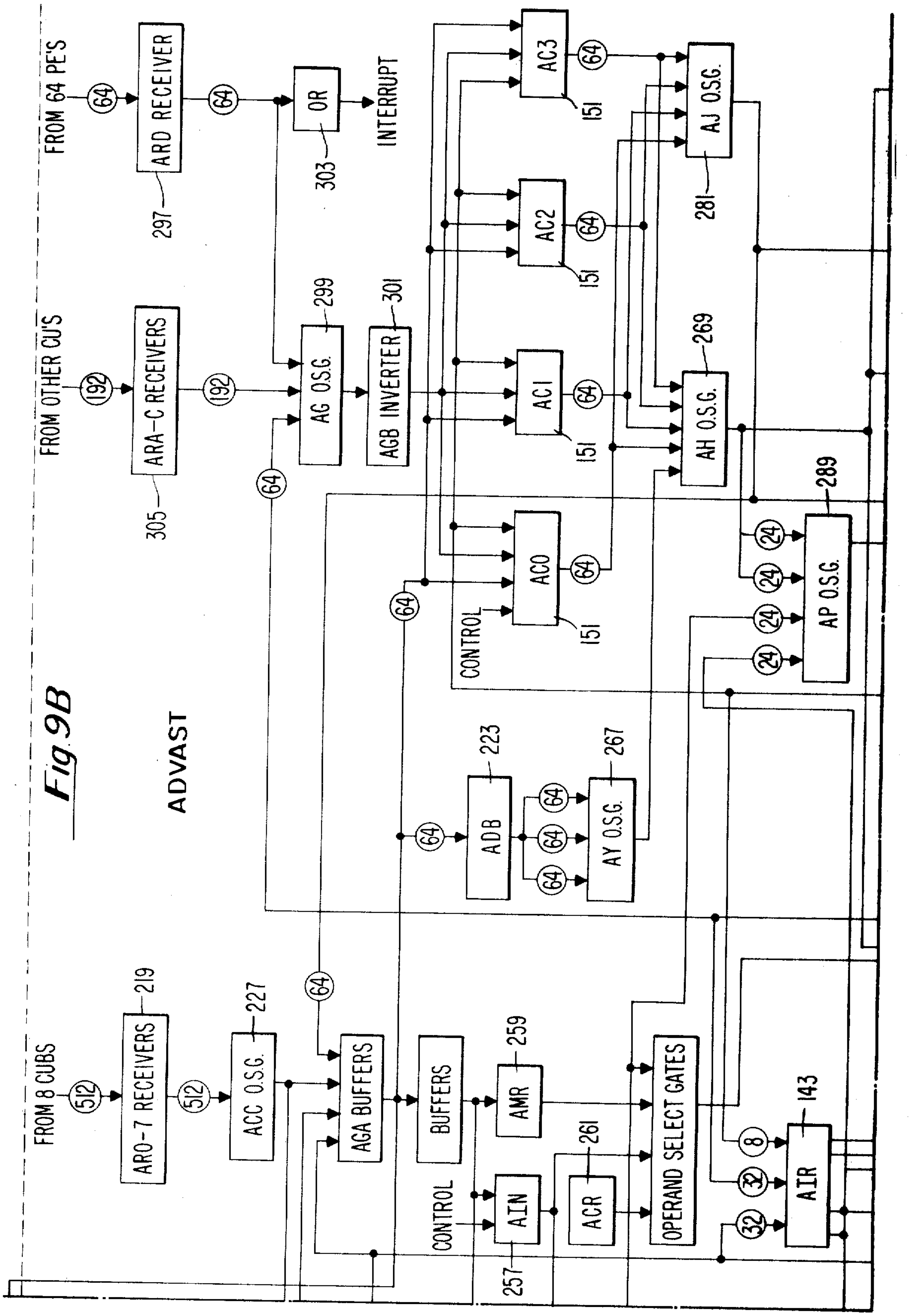
Figure 9C:
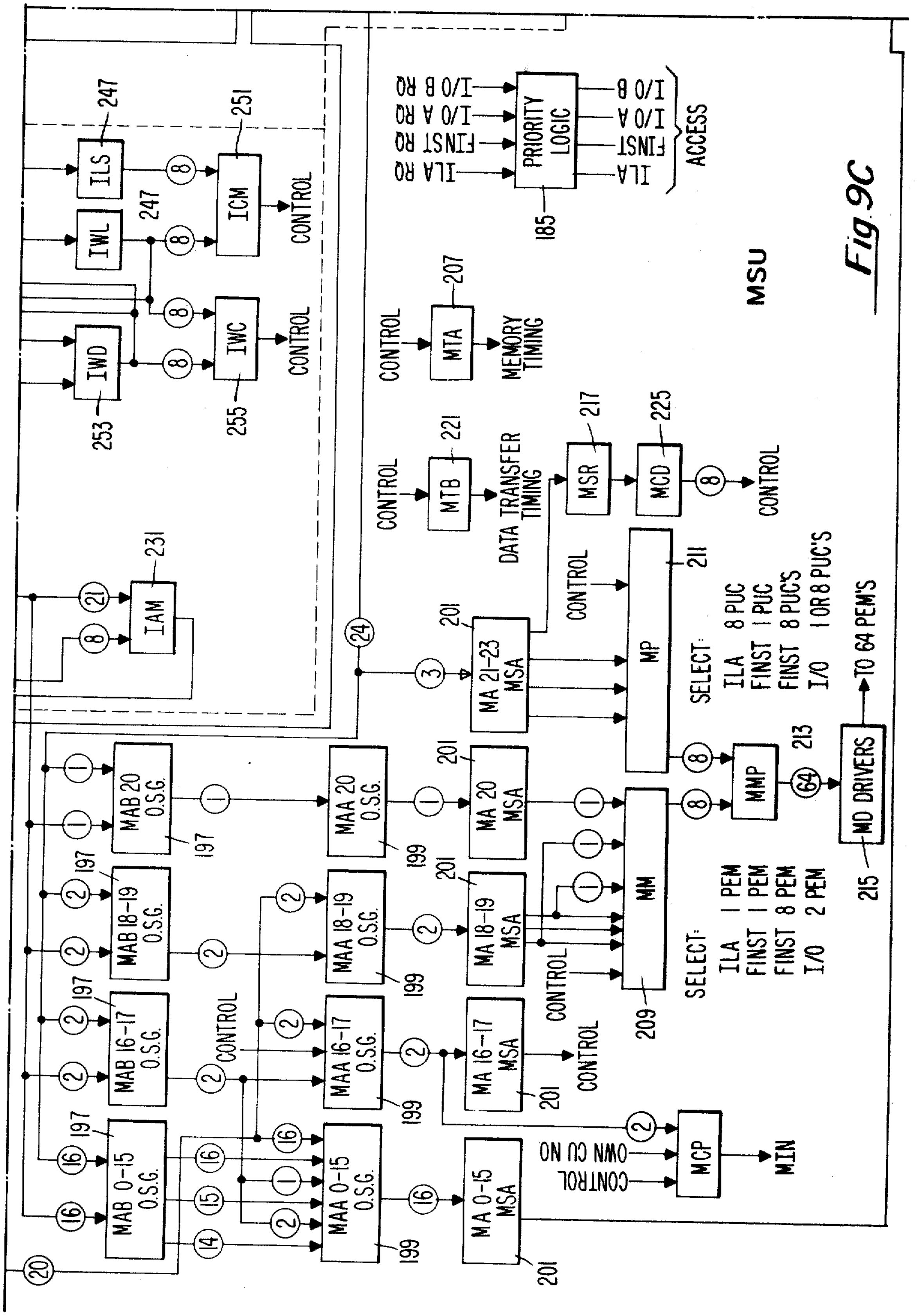
Figure 9D:
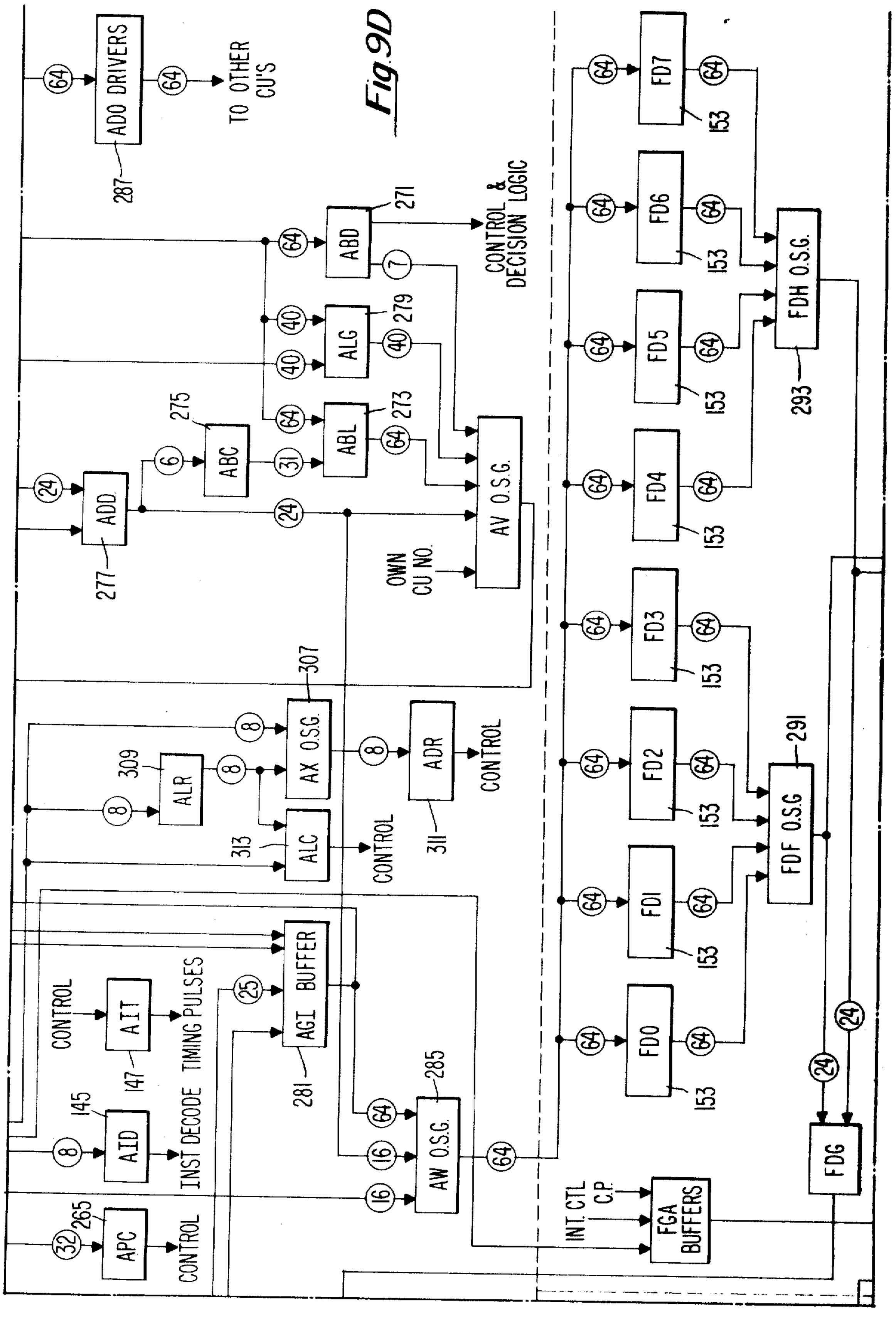

The MAB 197 and MAA 199 are each shown in the drawings, FIG. 9E, as being divided into four blocks and the MSA 201 as being divided into five blocks. The first block contains bits 0 through 15 and specifies the memory location within a PEM. The second block contains bits 16 and 17 which determine which quadrant is being addressed. The third block contains bits 18 and 19 and specifies pairs of PEM's in a PUC 39, FIG. 2, and the fourth block contains bit 20 and specifies one of the pairs. The fifth box of the MSA 201 contains bits 21 through 23 which specify the PUC 39 number.

In order that the address from the ADVAST or ILA be inserted into the correct position in the MSA 201 when the operands or instructions in one or two quadrants bits 0–17 must be shifted two or one places to the left, repectively, in MAA 199 under the control of the Configuration Control Logic. If the program or operands are stored in one quadrant the number of that quadrant specified in the registers of the Configuration Control Logic, is inserted into bits 16 and 17 of the address after the two place left shift has taken place in MAA 199.

If the program or information is stored in 2 quadrants the lower or higher numbered quadrant's number is inserted into bits 16 and 17 of the address after a one place left shift depending on whether original bit 17 is a "ZERO" or "ONE," respectively, If the information is stored in all four quadrants bits 16 and 17 of the address received by the MSU contains the quadrant number and no shifting or modification is performed in MAA 199. Addresses received from the I/O are also transmitted straight through the MAA 199.

From MAA 199 bits 16 and 17 of the modified address are inserted into the comparator MCP 205 where they are compared with the CU's own number. If they are not equal, the quadrant under control of the CU is not being addressed. If the two are equal, the PEM's associated with the CU are to perform the operation and the MCP 205 generates a Memory Initiate signal (MIN) under the control of the Memory Timer (MTA) 207 to indicate the memory cycle.

Bits 0 through 15 of the address are transmitted by the MSA 201 to the FINST which broadcasts them to the PE's over the CDB 59. Bits 18 through 20 are transmitted to the MM 209 which is a set of gates used to select the PEM's in the PUC 39. The logic permits selection of one memory per PUC 39 for all of the ILA or FINST operations, two memories for I/O operations and all eight memories for PE operations.

Bits 21 through 23 of the MSA 201 are transmitted to the MP 211 which is a set of gates used to select the PUC 39 to perform the operation. A single PUC 39 is selected for a single operand fetch or stores for FINST. In all 8 operand FINST or ILA fetches and all I/O or PE operations all 8 PUC's are selected. Since the ILA and I/O always select all 8 PUC's 39 on a fetch they do not need to specify bits 21–23 of the address. The I/O always fetches or stores 16 operands at a time and selects 2 PEM's per PUC. Therefore. addresses from the I/O do not have to specify bit 20 of the address either.

MMP 213 is a set of gates which decodes the outputs of MM 209 and MP 211. The output of MMP 213 is a set of 64 lines which are connected through the drivers MD 215, one to each PEM of the array, for selecting that PEM to perform the operation. Either 1, 8, 16 or 64 PEM's may be selected at any one time.

The Cabinet Select Register (MSR) 217 is a three bit register which holds the PUC 39 number for data to be sent to the CU on a single operand fetch for enabling the proper one of the receivers AR0–AR7 219. Once the data has been read out of the Memory Plane into the MIR 57 it has a relatively long path on the order of 7 clock times, to travel to the CU. It would be costly to tie up the MIR 57 for this length of time so a Control Unit Buffer (CUB) is provided as part of each PUB 41. The CUB provides temporary storage for the data and allows the memory to go on with other operations.

The Memory Timer (MTA) 207 and Memory Data Transfer Timer (MTB) 221 control the timing of memory operations. MTA 207 controls the timing of operations which prepare for the memory cycle, for instance, inserting the address into the MSA 201, broadcasting the operand over the CDB 59 and controlling time restandardizing logic in the CUB. MTB 221 controls the flow of data from the memory through the CUB to ADVAST.

When the data from the PEM is transferred from the MIR 57 to the Output Select Gates 127 the Controls 137 in the PEM generate a signal to the CUB telling it to read the data. The MTB 221 then generates the strobes to ADVAST to read the data from the CUB. These strobes are generated a set time after the initiation of the memory cycle.

The data from the various CUB's comes on 512 lines into a set of 512 receivers AR0–AR7 219. These 512 lines contain either 1 or 8 words of data or instructions. If the CU is receiving 8 words of data, all 8 sets of 64 lines into a designated portion of the Local Data Buffer (ADB) 223 from AR0–7 219 are enabled. In the case of one word fetches, the CU selects the set of 64 lines specified in MCD 225 by the use of the Operand Select Gates 227 (ACC) to be stored in one of the Local Memory Registers. If the CU is fetching an 8 word block of 16 instructions from PEM's they go to the ILA portion of the CU from AR0–7.

There are two sections within the ILA. The first section is used for instruction execution under normal conditions and the second section is used for instruction execution during an interrupt condition. Both sections use portions of a local memory to store instructions. The instruction Word Store (IWS) 141 is a 64 word 128 instruction storage (this porton will be referred to as the IWS 141). The other 8 words are used as the Interrupt Instruction Storage (IIS) 229.

Associated with IWS 141 is an associative memory (IAM) 231 which consists of a group of registers which store the memory addresses of the instruction blocks stored in IWS 141. A presence bit is included with each one of the addresses in the IAM 231 which indicates the presence or absence of a useable instruction at that location.

When the machine is initialized, i.e., when a new problem is to begin, the IWS 141 is empty and all the presence bits are reset. As each block of instructions is loaded from the IWS 141 the corresponding presence bit is set.

The 56 64-bit words in IWS 141 are broken down into 7 blocks of 8 words each. Each of these blocks has a 21 bit memory address associated with it in the IAM 231. Since the 8 word block can be defined with 21 bits, the three least significant bits of the instruction address are not needed in this particular application.

When the machine is initialized, an 8 word block of instructions is fetched from memory and stored in the IWS 141. At the same time, the address for the block is stored in IAM 231 and the presence bit associated with the block is set. Instruction execution begins be sending the first instruction of the 16 within the block to the AIR 143 for processing. Operand Select Gates IGA 233 select the instruction in the right or left half word in IWS 141. The procedure of sending the instructions one at a time from IWS 141 to AIR 143 continues until the 8th instruction of the 16 is executed. At this time, the ILA establishes what the next instruction block address is and checks the IAM 231 to determine whether it is already present in the IWS 141. In the case of the initialization condition, the next block is not present; therefore, the ILA fetches another block of instructions from main memory and stores it in the next block location of IWS 141. This procedure continues until the IWS 141 is filled with 112 instructions stored therein.

If the 8th block of instruction is a new block the oldest block in the IWS 141 is overwritten with the new block and the address associated with the new block is loaded into IAM 231 at the location of the oldest block address. This process can continue indefinitely with each new block being written over the oldest block in the IWS 141.

There is a deviation from the above procedure whenever there is a "jump" instruction. In a "jump" instruction a new address is generated and instead of executing the instructions in sequence as stored in IWS 141, a jump to another part of the program occurs. If the jump address is present in the IAM 231 then the corresponding instruction is sent from IWS 141 to the AIR 143. If the instruction is not present, the ILA fetches the proper block from memory and overwrites the oldest block in the IWS 141. Any number of jumps can be handled one at at time. The IWS 141 is especially useful in the case of repetitive programs or subroutines which are less than 112 instructions long in that when the least instruction of the iterative subroutine is under execution, the program can again jump to the first instruction and loop around the IWS without requiring any fetches from memory.

As stated above, each of the 7 addresses in the IAM 231 has a presence bit associtaed with it which is set when a block of instructions from memory is loaded into the corresponding portion of IWS 141. The presence bits remain set until the machine is turned off or the size of the array is changed. For instance, if the system is operating in a two quadrant mode and switches to a four quadrant mode, the program storage changes from two sets of PEM's to all four sets of the PEM's. This condition causes the contents of IWS 141 to become invalid. Therefore, all the presence bits are reset and the ILA again begins fetching instructions from the PEM's.

There are a number of registers in the ILA which indicate the location in the IWS 141 to store the next block of instructions and the location in IWS 141 from which to read the next instruction. The Instruction Block Load Pointer (IBL) 235 is an eight bit ring counter which determines the block within the IWS 141 in which to store the next block of instructions from memory. Each bit corresponds to a block located in IWS 141 and the setting of a bit indicates that the related block is to be loaded. IBL 235 also determines the IAM 231 location into which the instruction block address is to be stored. Only 7 bits may be used in normal operation, the 8th bit being reserved for interrupt mode.

The Instruction Block Read Pointer (IBR) 237 is an eight bit ring counter which points to the block of instructions in IWS 141 which is presently under execution. The Instruction Block Comparator (IBC) 239 compares IBR 237 and IBL 235 to protect against loading instructions into the same block in IWS 141 that is presently being used.

The Instruction Counter Register (ICR) 241 is a 25 bit register which holds the address of the next instruction to be executed.

The least significant four bits in the ICR 241 establish which of the 16 instructions within a block is being executed at the present time. The addresses used in the ILA are 25 bits long with the first 24 bits being the main memory address and the least significant bit designating the right or left hand instruction.

The Instruction Address Adder (IAA) 243 is used to establish the address of the next instruction by adding ONE to the instruction address presently under execution or, in the case of a jump instruction, by adding the skip field to the instruction address. At the execution of the eighth instruction of each block the IAA 243 after first incrementing the address as before, increments the block address by adding a ONE to the first twenty bits of the address. This incremented block address is then sent to the Instruction Address Register (IAR) 245, where it is compared with the contents of the IAM 231. If it is not in the IAM 231 then it is sent to the MSU in order to initiate a new fetch for a block of eight words.

The Instruction Address Register (IAR) 245 contains the address of the next instruction to be executed in the case of a jump instruction or, when the 8th instruction of a block is being executed in AIR 143, holds the address which is presented to the MSU for fetching the next block of instructions. Whenever a new address is stored in IAR 245 its contents are compared with the contents of IAM 231 to determine if the instruction at the address specified in IAR 245 is already present within the IWS 141, in which case, a fetch is not required. If the instruction is not present, the ILA makes a request of the MSU to institute a fetch.

During the loading of a block of eight instruction words into IWS 141 from memory, the Instruction Word Load Pointer (IWL) 247, which is an eight bit ring counter, points to the address within the block location into which the next instruction word is loaded. The Instruction Word Local Storage (ILS) 249 stores the position of the first word loaded into IWS 141. The Instruction Comparator (ICM) 251 compares IWL 247 and ILS 249 and inhibits further loading when eight words have been loaded.

The Instruction Word Decoder (IWD) 253 decodes bits 21–23 of the ICR 241 into an eight bit code which is sent to the IWS 141 for enabling the proper word out of a block of IWS 141. The Instruction Word Comparator (IWC) 255 compares the IWL and the IWD 253 for inhibiting the sending of an instruction to AIR 143 until the instruction has been loaded into IWS 141.

The ADVAST contains an Interrupt Register (AIN) 257 and a Mask Register (AMR) 259 each of which has a separate bit for each type of interrupt that the array is to sense. These interrupt conditions include the standard interrupts for computers, for instance, parity errors, undefined instructions and overflows and some special interrupts needed for an array system.

For some types of problems it may not be necessary to sense all the types of interrupts. To prevent their being sensed, the corresponding bit of AMR 259 is set and the interrupt is ignored. When an unmasked interrupt is detected the interrupt instructions are taken from IIS 229. The IIS 229 performs functions similar to the IWS 141 in normal program execution. The blocks described above, in relation to the IWS 141, establish which of the interrupt instructions is being executed. One bit in a register of miscellaneous control bits (ACR) 261 in ADVAST establishes the interrupt base address which gives the location in memory where the storage of the interrupt program begins. The contents of certain of the CU registers are stored in main memory in locations relative to the interrupt base address when the interrupt execution is begun and are refetched into the CU at the end of the interrupt procedure. The contents of ICR 241 are stored in Instruction Interrupt Address (IIA) 263 to preserve the address of the instruction to be executed when the interrupt has been processed.

As stated previously, instructions may be executed either in the ADVAST or FINST. In the illustrated embodiment of the invention both types of instructions are 32 bits long but have different formats. The format for the ADVAST type of instruction starting from the most significant bit is as follows:

| Bit Field | Description |
|---|---|
| 0, 1-4 and 20-23 | The operation code. |
| 24-31 | The local address field which defines which of the addressable registers in the CU is to be operated upon by the instruction. In a shift instruction it holds the shift count and in some instructions it indicates which bit in the Accumulator Register 151 is to be tested. |
| 5 | Indicates whether or not the local address field of the instruction is to be indexed. |
| 6, 7 | If the local address field is to be indexed, these bits indicate which Accumulator Register 151 is to be used to index it with. The 8 least significant bits of the Accumulator Register 151 hold the indexing number. |
| 8-15 | Gives the number of instruction words to be jumped in a "skip" instruction. Bit 8 is a sign bit which tells whether the skip should be forward or backward. Bits 9 through 15 give the number to be skipped. |
| 16, 17 | Identifies which of the Accumulator Registers 151 is to be used as an accumulator for the execution of the instruction. When the contents of an Accumulator Register 151 are to be operated on by any CU type of instruction the number of the Accumulator Register 151 is specified by these bits. |
| 18 | Tells whether the instruction is to be executed by the CU's of the full array or only by the one CU. |
| 19 | Parity bit. |

The Parity of the instruction is checked with it is transferred from IWS 141 to AIR 143 in the ADVAST Instruction Parity Checker (APC) 265.

The local memory for the CU is made up of the addressable registers in the CU. The following registers whose functions are described separately are addressable and make up the local memory: MRI 181, MR0 183, MC0 187, and MC2 191 in the MSU; IIA 263 and ICR 241 in the ILA; and AIN 251, AMR 259, ADB 223, AC0, AC1, AC2, AC3 (151) and ACR 261 in ADVAST.

The Local Data Buffer (ADB) 223 contains 64 words of data and so requires 6 bits of the local address field to address one of them. Operands are read out of the ADB 223 through Operand Select Gates AY 267 and AH 269.

The arithmetic section of the ADVAST performs logical or arithmetic operations on operands in the Local Memory for allowing the programmer to control the operation of the PE's efficiently. For instance, the Bit Detector (ADB) 271 is used to detect the position of the most significant one bit in one of the Accumulator Registers 151 which may be related to some condition of interest in the PE's or the PEM's.

The Barrel Switch (ABL) 273 receives 64 inputs from the Accumulator Registers 151 and shifts them by between 0 and 63 places either to the right or to the left, either end off or end around, in response to control signals from the Barrel Control Logic (ABC) 275. The ABL 273 may be substantially identical to the Barrel 51 in the PE's. Bits 24 through 31 of the shift instructions contains the shift amount and are connected to ABC 275 which operates the proper controls for ABL 273.

The FINST instructions have the following format starting with the most significant bit:

| Word Bit Field | Description |
|---|---|
| 0 | ONE. |
| 1-4, 8-12 | Operation Code. |
| 5 | Indicates whether the address field of the instruction is to be indexed by one of the Accumulator Registers 151. |
| 6, 7 | Accumulator Register 151 number for bit 5. |
| 13 | When ONE, add RGX 93 content to address field before use. |
| 14, 15 | Address field usage. When bits 14, 15 or "0,0" the address field is to be transmitted to MAR 91 of the PE's and used to initiate a memory cycle, which then furnishes one of the operands required by the instruction. When these bits are "1,0", the address field is to be taken literally as the operand. When these bits are "1,1", the address field contains a three-bit code which specifies one of the PE registers as the source of data. A "0,1", indicates that one should add RGS 87 to the address before fetching. |
| 16-31 | Address field. |

The ADVAST Adder (ADD) 277 may be used for a number of purposes among which are the indexing of the main memory address contained in the FINST type instructions, or the local address field for ADVAST instructions, performing exclusive OR, and acting as a comparator.

If bit 5 specifies that the address field is to be indexed, the contents of the specified Accumulator Register 151 is added to it in ADD 277. After the address is indexed at ADD 277 it is transferred by the normal path through FINST to the PE's where it can be further indexed by RGS 87 or RGX 93. Each of the 64 PE's receives the same address generated by ADVAST. However, if the option to index within the PE is specified and the indexing number is different from the various PE's, then the PE's work on operands from different locations in the associated PEM's.

The "EXCLUSIVE OR" function may be performed between operands from one of the Accumulator Registers 151 and local memory. The operation is performed on 40 bits of the operands in the Logic Unit (ALG) 279 and the other 24 bits in ADD 277.

Operands from the ADB 223 or the four Accumulator Registers 151 are sent to the arithmetic portions of ADVAST and to the other portions of the system through Operand Select Gates AH 269 and AJ 281. AH 269 selects the output of one of the Accumulator Registers 151 or ADB 223 to be sent to the FINST Data Queue 153 through Buffer AGI 283 and Operand Select Gates AW 285. AH 269 is also used to select the contents of one of the Accumulator Registers 151 to be sent to the other CU's through Driver ADO 287 or to be used as the index during the indexing of the local address field of ADVAST type instructions in ADD 277.

AJ 281 selects the contents of one of the Accumulator Registers 151 as the main memory address for ADVAST memory operations or as an operand for all arithmetic and logical operations in ADVAST. The second operand for arithmetic or logical operations to be performed in the ADD 277 is selected by Operand Select Gates AP 289.

Each of the PE's contains a Mode Register (RGM) 63 (FIG. 5A), whose functions are explained in the description of the PE. There is a set of instructions which send the contents of one of the Accumulator Registers 151 to the RGM 63, one bit to each PE. Each of the instructions sends the Accumulator Register 151 to a different bit of the RGM 63. In the illustrated embodiment of the invention the selected Accumulator Register 151 is stored in the FINST Data Queue 153 of the Final Station. From the FINST Data Queue 153 the bits are sent through Operand Select Gate FDF 291 or FDH 293 and FDS 179 to the FDE 295. The FDE 295 sends one bit to the RGM 63 of each of the PE's.

The CU also controls the operation of the Mode Logic 111 (FIG. 5A) in the PE's performing various logical operations on the bits in the RGM 63. The instruction which orders these operations are PE type instructions and specify in their 16 bit address fields the operation to be performed and on which of the bits in the RGM 63 it is to be performed. The result bit of the operation can be stored in the RGM 63.

The result bits from the 64 PE's are also sent to one of the Accumulator Registers 151 of the CU through Receiver ARD 297, Operand Select Gate AG 299 and Inverter AGB 301 with the bits being combined into a 64 bit word at ARD 297. The CU can also OR the 64 bits together in the OR Gates 303 and use the output of this operation to initiate an interrupt routine, as, for instance, when a fault bit is being detected. The performance of logical operations with bits of the RGM 63 (FIG. 5A) requires the CU to wait until the result bit is received from the PE's before continuing with the next instruction.

AG 299 is also used to select the data transmitted by one of the other CU's in the array and received by Receiver ARA–C 305.

Operand Select Gates AX 307 gates a local address from the AIR 143 or the Local Memory Address Register (ALR) 309 into the Local Memory Address Decoder (ADR) 311. ADR 311 decodes the local address for enabling the desired locations in local memory as a source or destination of operands in ADVAST operations or as a destination for operands in fetches from main memory to ADVAST. In ADVAST operations the local address is in AIR 143 and is gated from there by AX 307 into the ADR 311.

When ADVAST requests an operand fetch from main memory the local memory address is stored in ALR 309 and the instruction operation code is transferred to the FINQ 149. At the same time, the main memory address from which the operands are to be fetched is transferred from the Accumulator Register 151 specified in bits 16 and 17 of the instruction to the FINST Data Queue 153. When FINST detects the operation code it executes the memory fetch by means of the MSU. The operand when returned by memory, is received in ADVAST and stored according to the local memory address which has been gated from the ALR 309 to the ADR 311 by AX 307.

The ADVAST memory fetch instructions can order a fetch of one or eight words from the PEM's.

If the local address stored in ALR 309 for the pending fetch designates a location in the ADB 223, another instruction is inserted into the AIR 143 and its local address field is compared with the contents of ALR 309 in the ADVAST Local Address Comparator (ALC) 313 to determine if they are equal. If they are, the ADVAST waits until the pending fetch is complete before using the contents of the location specified. If they are not equal, then ADVAST continues to execute instructions and stops only when a subsequent instruction uses the same address of ADB 223. If the address in ALR 309 is for a location in local memory other than ADB 223, ADVAST waits until the memory fetch is completed.

A store operation proceeds in much the same manner. The operation code and the PEM address are inserted in FINQ 149 and FINST Data Queue 153, respectively, in one clock time and the data word to be stored is transferred to FINST Data Queue 153 during the next clock time. The word to be stored is broadcast over the CDB 59 to the PE's from which it is sent to the MIR 57. Only one word may be stored in the PEM's at one time.

The route instruction causes the contents of the RGR 47 (FIG. 5A) of all the PE's to be rotated amongst themselves so that, for example, on a +1 shift the contents of RGR 47 of all the PE's are sent to the next highest number PE. If it is desired to route the contents of a register other than RGR 47 to another PE it is necessary to transfer the contents of the other register to the RGR 47 before executing route instructions.

If the machine is operating in single quadrant array mode then the transfers are end around within the quadrant. In a multiquadrant array the quadrants may be thought of as being numbered 0, 1, 2, 3 (FIG. 2). In a +1 shift in a two quadrant mode PE 63 of quadrant zero sends its contents to either PE 100 if quadrants zero and one, PE 200 if quadrant zero and two, or PE 300 if quadrants zero and three are connected together in the array. PE's 363, 263 or 163 would send their contents to PE zero.

When FINST transfers the instruction to the FIR 165 to the PEM address from FINST Data Quest 153 is sent to the MSU where it is interpreted in MAA 199 and inserted into MSA 201. Control Logic in the MSU receives a WRITE/READ, an eight word fetch and a "send to ADVAST" signal from FID 167. The MSU then initiates the memory operation.

It is possible to route by as many as 255 PE's away in a four quadrant array. However, since the routing may be either in a plus or minus direction, the maximum route distance is 128. If the amount of the routing is 128 or less, it is done in the plus direction, if it is between 128 and 256 the routing is done in the negative direction.

A route other than ±8 or ±1 requires a plurality of routing operations in order to carry out the one instruction. The route amount is decoded in FID 167 and FCC 169 to determine how many routes of what type must be performed and the subcommands for the routes are generated sequentially and broadcast to all the PE's through FCD 173.

Input/Output Subsystem

Figure 10:
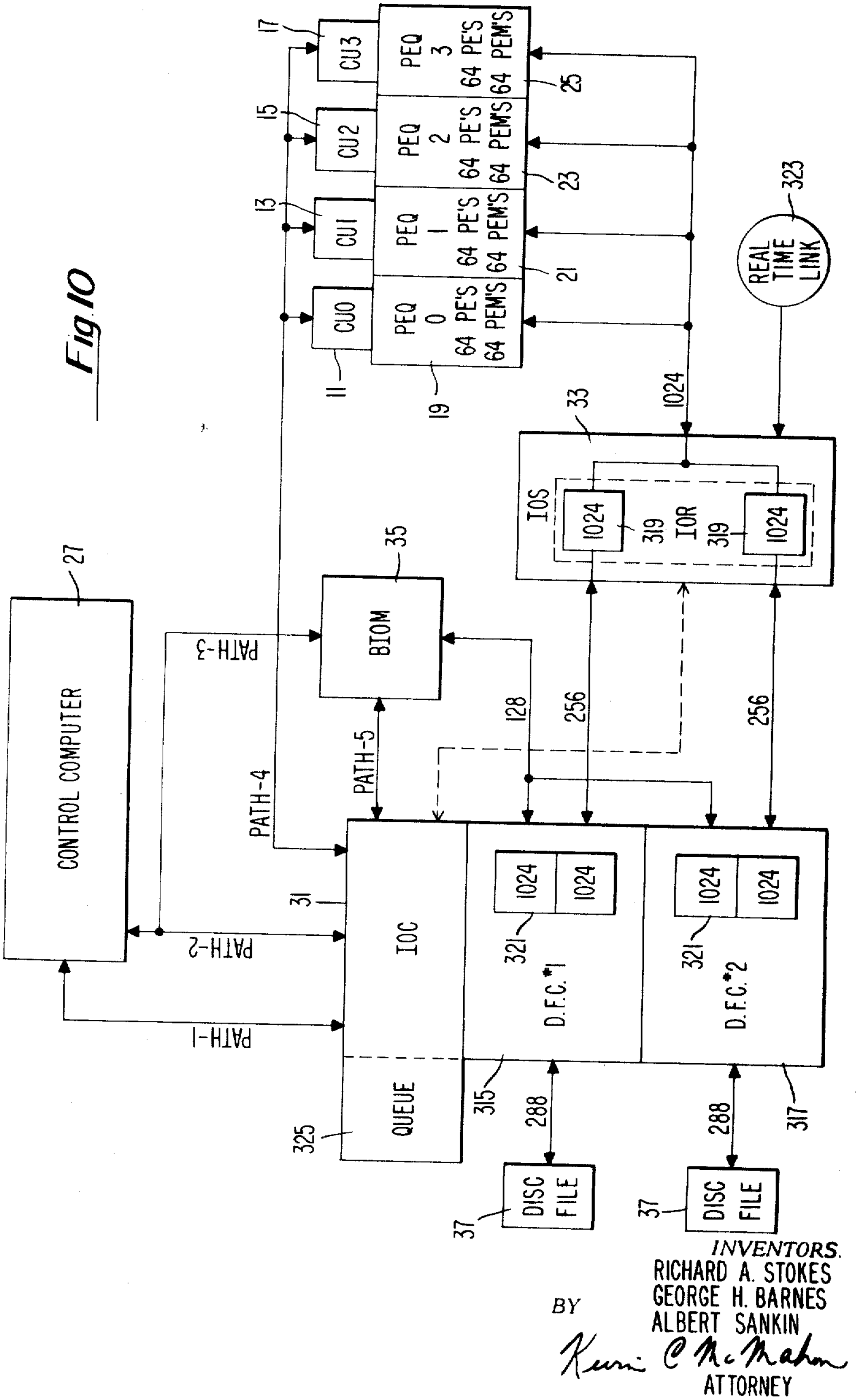
FIG. 10 is a block diagram of the input/output subsystem.

The Input/Output (I/O) Subsystem, which is best shown in FIG. 10 of the drawings, has several functions. It transfers the program for the CU's from the Control Computer 27 to the PEM's of the PE arrays, transfers data at an extermely high rate of speed between the PEM's of the arrays and the Disc File Memory 37, and transfers data between the Disc File 37 and the Control Computer 27. It also permits the Control Computer 27 to control the operation of the CU's and their associated PE arrays.

The I/O Subsystem includes in Input/Output Controller (IOC) 31 which communicates directly with Disc File Controller #1 (DFC 1) 315 and Disc File Controller #2 (DFC 2) 317. Also included in the Input/Output Subsystem in a Buffer Memory (BIOM) 35 for transferring data between the Control Computer 27 and the Disc File 37, and an Input/Output Switch (IOS) 33 used for information transfers between the Disc Files and the PEM's. DFC 1 and 2 315 and 317 control the operation of two disc file systems 37 which form the mass memory for the computer system. A multiple disc file with its associated controls similar to one which may be used in carrying out this invention is described in U.S. patent application, Ser. No. 509,925 by Bennett et al. which is assigned to the assignee of the present invention.

The IOC 31 communicates with the Control Computer 27, FIG. 1, over path 1 which may include 20 instruction lines, 48 response lines and 8 lines for control purposes. It also communicates with the Control Computer 27 over a separate path (path 2) which in this embodiment of the invention includes 48 data lines from the memory of the Control Computer 27, 20 address lines to the memory of of the Control Computer 27 from IOC 31 and 8 control lines for parity and other control bits.

The BIOM 35, which may be substantially similar to a PEM except for having different control logic, expedites communication between the Control Computer 27 and the Disc File 37. In the present embodiment of the invention data is read out of or written into the Disc File 37 at a rate of approximately 288 bits per 570 nanoseconds while data is or may be read out of or written into the Control Computer 27 at a much slower rate. The BIOM 35 is a very high speed memory which provides memory buffering between them. In data transfers between the Disc File 37 and the Control Computer 27 up to 1,024 bit words of data are first written into the BIOM 35 at a fast or slow rate of speed, depending on which one is doing the writing, and then read out at a slow or fast rate, respectively, by the other.

The BIOM 35 communicates with the Control Computer 27 over path 3 which may be connected to the same terminal on the Control Computer 27 as path 2 and therefore, also includes 20 address lines to the memory of the Control Computer 27, 48 data lines between the memory of the Control Computer 27 and the BIOM 35 and 8 control lines.

The IOC 31 communicates with the CU's over path 4 which includes 69 lines for transferring data and instructions directly to or from the CU. These input and output I/O lines to the CU interface with the MR1 181 and MR0 183 of the MSU portion of the CU respectively.

Path 4 also includes 24 lines for determining the locations in the PEM's which are to be addressed by the I/O Subsystem, twenty of these lines are address lines which go to the MAA 199 of the MSU through the MRA 203. Two of the remaining lines are priority lines which go to the I/O terminals of the Priority Logic 185. These lines may indicate either a high or low priority memory access request from the I/O. The high priority access request from the I/O takes precedence over all other users of the memory and receives access to the memory on the next cycle. The low priority access request has the lowest priority of all the users of the PEM's. The other two lines of path 4 interface with control logic in the MSU portion of the CU.

Data and the CU program are transferred between the Disc File 37 and the PEM's of the arrays through the IOS 33. The IOS 33 includes the Input/Output Register (IOR) 319 which is made up of two 1,024 bit registers. DFC 1 315 communicates with one of the IOR registers over a 256 bit path and DFC 2 communicates with the other IOR register over another 256 bit path. Each of the DFC's include two 1,024 bit registers 321 which hold the inputs from the outputs for the IOS 33 and the BIOM 35 to and from their associated Disc File 37. The registers of each of the DFC's are filled alternately so that, for instance, one register 321 in DFC 1 315 may be transferring information to the associated Disc File 37 while the other register 321 of DFC 1 317 is receiving information from BIOM 35 or IOS 33. Both Disc Files 37 may be loaded or read from simultaneously with the IOS 33 loading or reading from both pairs of registers 321 in the DFC's at the same time.

A 1,024 bit path exists between the IOR 319 of the IOS 33 and the PEM's of the PE arrays. In each of the quadrants the path is divided into sixteen 64 bit words which are connected two words each, through the Processing Unit Buffer (PUB) 41 of the eight PUC's 39 to the PEM's and read from or written into two PEM's per cabinet simultaneously. Transfers between the Disc File 37 and the PEM's of the array are always performed in 16 word blocks.

A Real Time Link 323 is connected to the PEM's through the IOS 33 for allowing an outside data source, such as a radar, to insert data as it generates it directly into the PEM's at the same rate of speed as the data is produced.

In order to transfer data from the Control Computer 27 to the disc 37, the Control Computer 27 first sends an Initiate I/O Command to the IOC 31 via path 1. Next, two words of descriptor are sent to the IOC 31 on path 2 from the Control Computer 27. The IOC 31 examines the descriptor words and upon determining their purpose, sends the descriptor words to the BIOM 35 over path 5. Once in the BIOM 35 the descriptors control the transfer of data from the Control Computer 27 into the BIOM 35 over path 3. When the desired amount of data is completely loaded into the BIOM 35 the descriptor is placed in a queue 325 contained in the IOC 31.

The queue 325 whose structure and operation are more fully described in the aforementioned application by Bennett et al. holds the addresses of the location in the Disc File 37 into which information is to be inserted or from which it is to be read. In order to minimize the waiting time access to the Disc File 37 is given in the order in which the locations corresponding to the addresses in the queue 325 come up on the disc 37. This procedure is necessary since it may take as many as 40 milliseconds for a location to be reached on the disc 37. As stated before, once the location on the disc 37 is reached, the data transfer rate is very high.

The upcoming addresses on the disc 37 are continually compared with the addresses in the queue 325 and when a match is achieved the operation specified in the descriptor using the upcoming address is initiated. The sensing of the upcoming address takes place a sufficient time before the actual arrival of the address at the read/write heads for the operation specified in the descriptor to be performed so that the specified DFC will be ready to read from or write onto the disc.

In the case of a transfer of data from the Control Computer 27 to the disc 37, when the address specified in the descriptor comes up on the disc, the data stored in the BIOM 35 is transferred 128 bits at a time to the registers in the designated DFC. When one of the registers is full it transfers its data to the desired location on the associated disc 37 288 bits at a time while the other register receives data from the BIOM 35 128 bits at a time. This operation continues until all of the information in the BIOM 35 is transferred to the disc 37.

In order to transfer data from the Disc File 37 to the PEM's an initiate I/O Command and two words of descriptor are sent from the Control Computer 27 to the IOC 31 on paths 1 and 2, respectively. After the IOC 31 examines the descriptors and determines the operation specified, the descriptor is inserted into the queue 325. When the address comes up on the Disc File 37, the data is transferred from the disc 37 to the PEM's through the associated DFC and the IOS 33. The address in the PEM's in which the data is to be inserted is sent from the IOC 31 to the CU's over path 4.

The two 1,024 bit registers which make up the IOR 319 receive data from the DFC's over separate 256 bit paths. When the IOR register being used is full, a signal is sent through the IOC 31 to CU's to initiate a memory cycle of PEM's. If data is to be transferred from the Control Computer 27 to the PEM's it is first transferred to the Disc File 37 and then by a separate instruction is transferred to the PEM's.

If it is desired to transfer data from the PEM's to the Disc File 37, the Control Computer 27 sends an Initiate I/O Command over path 1 and the proper descriptor over path 2. The IOC 31 inserts the descriptor into the queue 325 and when the address comes up on the disc 37 a command is sent to the CU to initiate a memory cycle of the PEM's. The memory cycle is initiated and the data is transferred from the PEM's through the IOS 33 to the proper DFC. From there it is loaded into the proper place on the disc 37.

When information is to be transferred from the disc 37 to the Control Computer 27 the Initiate I/O signal is again generated and the descriptor from the Control Computer 27 is placed in the queue 325. When the address comes up the information is transferred from the Disc File 37 to the BIOM 35 and is read from there by the Control Computer 27 at its own speed.

At the end of the execution of any I/O operation an interrupt signal is sent to the Control Computer 27 on path 2. When this occurs a command is sent over line 1 to the IOC 31 to read the contents of a special interrupt in the IOC 31 whose contents are transferred to the Control Computer 27 over line 1. The contents of the register is called a result descriptor and includes most of the original I/O descriptor in order to let the Control Computer 27 know what instruction has just been executed. The result descriptor also includes either a "Normal Complete" signal or some other signal to let the Control Computer 27 know that either the operation has been completed or that error has occurred.

If a higher data rate between the Disc File 37 and the PEM's is required for a particular application of the invention, it is possible to enlarge the IOS 33 so that 32 or even 64 words may be transferred at a time between the PEM's and the IOS 33. The mass memory capacity of the invention may be increased by adding any desired number of pairs of Disc Files 37 and including a switching circuit between the Disc File 37 and the DFC's for switching the DFC's among them.

It is to be understood that the foregoing description of the embodiment of the invention has been given by way of example only, and, as will be clear to one skilled in the art, modifications to fit the needs of individual users may be made without departing from the scope of the invention.

What is claimed is:

1. High speed data processing apparatus comprising:

at least one array of processing elements, each of said processing elements including means for performing arithmetic and logical operations on data, a control unit coupled to said at least one array, separate memories coupled to each of said processing elements for storing operands for use in said associated processing elements and a portion of the program and operands for the associated control unit, said control unit comprising:

means coupled to said processing element memories for fetching operands and instructions from the processing element memories to said control unit, said instructions including those for execution in said control unit and others for controlling said processing elements, first and second decoding and execution stations coupled to said fetching means, said first station including means for examining one at a time said instructions fetched from said memories and for transmitting the instructions for controlling said processing elements to said second station, and means for executing the other instructions, said second station including queuing means for temporarily storing both a plurality of instructions transmitted from said first station and operands associated with said instructions, means coupled to said queuing means for decoding said instructions in said queuing means one at a time for transmission of said decoded instructions to all of said processing elements, for controlling said processing elements on a microsequence level, and means for transmitting said associated operands to said processing elements with said decoded instructions.

2. The data processing apparatus of claim 1 including a plurality of arrays of processing elements and control units, each of which control units further comprises:

configuration control means coupled to said decoding and execution stations and including first register means for determining how many of said arrays are working on a problem and second register means for determining in which of said processing element memories the instructions and operands for running said problem are stored.

3. The data processing apparatus of claim 2 further including:

a control computer for controlling the operation of said control units, and input/output means including means for transmitting signals from said control computer to said control units for controlling said configuration control means.

4. The data processing apparatus of claim 3 wherein said input/output means includes:

means coupling said input/output means to each of said processing element memories, a mass memory, and means coupling said mass memory to said input/output means to accommodate transfer of operands between said processing element memories and said mass memory and transfer of operands between said mass memory and said control computer.

5. The data processing apparatus of claim 1 wherein said processing elements include means connecting each of them to at least four other processing elements for transferring operands among them.

6. The data processing apparatus of claim 1 wherein said first execution stations includes means for selectively incrementing processing element memory addresses included in the instructions for controlling said processing elements.

7. The data processing apparatus of claim 6 wherein said processing elements include:

means for addressing the associated processing element memory, and means for selectively incrementing the processing element memory addresses transmitted from said control unit.

8. The data processing apparatus of claim 1 further including buffer means for temporarily storing instructions and operands being transferred from said processing element memories to said control unit, said buffer means including means for transferring said instructions and data to the buffer means of the other arrays for transfer to the control units of said other arrays, and wherein said control units further include configuration control means coupled to said decoding and execution stations and having first register means for determining the number of processing element arrays operating on the problem and a second register means for determining in which ones of the arrays the instructions and operands for the problem are stored.

9. The data processing apparatus of claim 1 wherein said each of said processing elements include mode control means responsive to the associated control unit and to conditions within said processing element for preventing changes in portions of said processing element unless said mode control means is set.

10. The data processing apparatus of claim 2 wherein said means for fetching operands and instructions from said processing element memories to said control unit include means responsive to said configuration control means for modifying memory addresses to specify the correct array.

11. The data processing apparatus of claim 1 wherein said second execution station further includes means for overlapping the transmitting an operand with the transmitting of a previous instruction which is not using said transmitting means.

12. The data processing apparatus of claim 3 wherein said control unit further includes means for controlling the priority of access to said processing element memories.

13. In an array computer having memory means and at least one array of substantially identical processing elements each of said processing elements including means for performing logical and arithmetic operations on data, a control unit for each array for controlling the operation of the processing elements of said array comprising:

means for controlling said memory means including:

means coupled to said memory means for initiating fetches and stores of instructions and operands bebetween said memory means and said control unit, and means for initiating transfers of operands between said memory means and said processing elements, means for storing said instructions fetched from said memory means, said instrutcions including those for execution in said control unit and others for controlling said processing elements, first and second execution stations, said first station including:

means for examining said instructions one at a time and for transmitting the processing element instructions to said second station, and means for executing the control unit instructions, said second station including:

queuing means for temporarily storing both a plurality of instructions transmitted from said first station and operands associated with said instructions, and means for decoding said instructions in said queuing means, one at a time for transmission of said decoded instructions and associated operands to all of said processing elements for controlling the operation of said processing elements on a microsequence level.

14. The computer of claim 13 wherein said memory means includes separate memories coupled to each one of said processing elements and wherein said first execution station includes means for incrementing memory addresses associated with said processing element instructions.

15. The computer of claim 14 wherein each of said control units include configuration control means including a first register means for determining which of said arrays are working on a problem and second register means for determining in which of them the instructions and operands for running said problem are stored.

16. A processing element, said processing element being one of a plurality of similar processing elements under the control of a control unit, each of said processing elements being associated with a memory, each of said memories storing operands for said associated processing element and a portion of the program for said control unit, comprising:

means, including registers, for performing logical and arithmetic operations on operands, means for addressing said associated memory for transferring operands between said memory and itself and between said memory and said control unit, means for incrementing the memory address, and mode control means responsive to said control unit and to conditions within said processing element for preventing changes in portions of said registers unless said mode control means is set.

17. The processing element of claim 16 further including means for transferring operands between itself and any one of at least four other processing elements.

18. An array of similar processing elements under the control of a control unit, each of said processing element comprising:

means for performing arithmetic and logical operations on operands, and means coupling each of said processing elements to four other processing elements for transferring operands between said processing elements and any of said four other processing elements according to a predetermined arrangement, said coupling means including register means within each processing element and interconnections between each register means and the register means of four neighboring processing elements such that the processing elements of the array are divided into equal groups and the groups and processing elements within each group are numbered in a folded fashion whereby the groups and processing elements within each group are numbered consecuitvely and interconnected in an order of 0, $n$, 1 (2—1)$n$—1, 2, $n$—2, . . . where $n$ is the number of groups or processing elements within each group, and said interconnections are made within each group end around between each processing element and its next higher and lower numbered processing elements and between processing elements of a group and corresponding processing elements of the next higher or lower numbered groups end around.

19. The apparatus of claim 18 further including a plurality of other arrays of processing elements, each substantially identical to said first named array, the processing elements numbered $o$ and $n$ of each of the groups within said arrays also being connected to the corresponding processing elements of the other arrays for transferring operands among them.

20. High speed data processing apparatus comprising:

a plurality of arrays of processing elements, each of said processing elements including:

means for performing arithmetic and logical functions on data, mode control means for disabling portions of said processing element unless said mode control means are set, and logic means for setting and resetting said mode control means dependent on conditions within said processing elements, a control unit for controlling each of said processing element arrays on a microsequence level, including means for setting and resetting the mode control means of individual ones of said processing elements, and configuration control means including first register means for determining which of said arrays are working on a problem and second register means for determining in which of said arrays the instruction and operands for carrying out said problem are stored, a memory for each of said processing elements for storing operands for use in said associated processing element and operands and instructions for said associated control unit, said processing elements further including means for addressing the associated processing memory, and means for incrementing the processing element memory address, said control unit further including means for fetching and storing operands and instructions to and from said processing element memories at the addresses specified in said memory addressing means in the associated processing elements, said instructions including control unit instructions and processing element instructions, first and second decoding and executing station, said first execution station including, means for examining said instructions fetched from said processing element memories one at a time for transmitting processing element instructions to said second execution station, means for executing said control unit instructions, and means for incrementing the processing element memory address, said second execution station including, queuing means for temporarily storing the instructions and associated operands received from said first execution station, means for decoding said instructions in said queuing means one at a time in order into a series of time voltage levels, means for transmitting said decoded instructions and said associated operands to all of said processing elements, and means in each array for transmitting the instructions and operands for carrying out a problem fetched from the processing element memories of that array to the other arrays working on said problem.

21. The data processing apparatus of claim 20 further including a control computer for controlling the operation of said control units, a mass memory, and input/output means for transferring control unit instructions and operands under the direction of said control computer between said control computer and said processing element memories, between said control computer and said mass memory and between said mass memory and said processing element memories.

22. The data processing apparatus of claim 21 wherein said control unit includes means for controlling the priority of access to said processing element memories.

References Cited

UNITED STATES PATENTS

| | | | |
|---|---|---|---|
| 3,287,702 | 11/1966 | Borck et al. ------ | 340—172.5 |
| 3,287,703 | 11/1966 | Slotnick ---------- | 340—172.5 |
| 3,312,943 | 4/1967 | McKindles et al. --- | 340—172.5 |

RAULFE B. ZACHE, Primary Examiner

PO-1050
(5/69)

UNITED STATES PATENT OFFICE
CERTIFICATE OF CORRECTION

Patent No. 3,537,074 Dated Oct. 27, 1970

Inventor(s) R. A. Stokes et al

It is certified that error appears in the above-identified patent and that said Letters Patent are hereby corrected as shown below:

In the drawings, sheet 7, Figure 4, the reference numeral "47" as applied to OPERAND SELECT GATES (OSG) should be changed to --49--.

Col. 1, line 47 change "fo" to --of--; line 48 change "throughout" to --throughput--; line 68 change "man" to --many--. Col. 3, line 46 change "shown" to --showing--. Col. 7, line 3 change "47" to --49--; line 12 change "61" to --71--; line 46 change "colsely" to --closely--. Col. 10, line 8 change "to" to --of--; line 22 change "CAS" to --CSA--; line 30 change "CAS" to --CSA--. Col. 11, line 63 change "RGR" to --RGA--. Col. 16, line 73 change "the" (first occurance) to --or--. Col. 18, line 37 change "ready" to --read--. Col. 22, line 71 change "be" to --by--. Col. 25, line 26 change "with" to --when--. Col. 27, line 67 change "Quest" to --Queue--. Col. 28, line 27 change "in" to --is--. Col. 30, line 52 after "interrupt" insert --register--. Col. 32, line 40 after "transmitting" insert --of--.

Col. 33, line 61 delete "(2-1)" and insert therefor a comma (,).

Signed and sealed this 27th day of April 1971.

(SEAL)
Attest:

EDWARD M.FLETCHER,JR.
Attesting Officer

WILLIAM E. SCHUYLER, JR.
Commissioner of Patents